US006768446B2

(12) United States Patent
Tamatsu et al.

(10) Patent No.: US 6,768,446 B2
(45) Date of Patent: Jul. 27, 2004

(54) VEHICLE-MOUNTED RADAR APPARATUS PROVIDING IMPROVED ACCURACY OF DETECTION OF LATERAL POSITION OF PRECEDING VEHICLE

(75) Inventors: Yukimasa Tamatsu, Oakazaki (JP); Hiroaki Kumon, Kariya (JP); Akira Isogai, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/443,796

(22) Filed: May 23, 2003

(65) Prior Publication Data

US 2003/0218564 A1 Nov. 27, 2003

(30) Foreign Application Priority Data

May 27, 2002  (JP) ........................................ 2002-152357

(51) Int. Cl.[7] .............................................. G01S 13/93
(52) U.S. Cl. ............................ 342/70; 342/71; 342/72; 342/77; 342/107
(58) Field of Search ............................... 342/70–75, 77, 342/82, 90–91, 94–96, 104, 107, 113–114, 118, 140, 147, 154, 158; 340/435, 436, 903

(56) References Cited

U.S. PATENT DOCUMENTS

| 4,158,841 | A | * | 6/1979 | Wuchner et al. ............... 342/71 |
| 5,023,617 | A | * | 6/1991 | Deering ........................ 342/70 |
| 5,670,963 | A |   | 9/1997 | Kubota et al. |
| 5,745,070 | A |   | 4/1998 | Yamada |
| 5,793,325 | A | * | 8/1998 | Yamada ........................ 342/70 |
| 5,949,366 | A |   | 9/1999 | Herrmann |
| 5,959,569 | A | * | 9/1999 | Khodabhai .................... 342/70 |
| 6,122,040 | A |   | 9/2000 | Arita et al. |
| 6,567,737 | B2 | * | 5/2003 | Nakamura et al. ............ 701/96 |
| 2003/0142007 | A1 | * | 7/2003 | Ono et al. ..................... 342/70 |
| 2003/0218563 | A1 | * | 11/2003 | Miyahara ..................... 342/70 |

FOREIGN PATENT DOCUMENTS

| JP | 8-320371 | 12/1996 |
| JP | 10-54875 | 2/1998 |
| JP | 10-332820 | 12/1998 |
| JP | 11-142520 | 5/1999 |

* cited by examiner

*Primary Examiner*—Thomas H. Tarcza
*Assistant Examiner*—Isam Alsomiri
(74) *Attorney, Agent, or Firm*—Posz & Bethards, PLC

(57) ABSTRACT

A vehicle-mounted radar apparatus which periodically derives and registers successive momentary position values for a target object such as a preceding vehicle based on received reflected radio waves and derives final lateral position data by smoothing the momentary position data, judges when a degree of scattering of the registered momentary position values exceeds a first predetermined level and in that case derives corrected position data based on differences between envelope curve line values which are generated based on local extreme values of the momentary position data, and performs smoothing of the corrected position data instead of the momentary position data, to obtain the final lateral position data. If the target object is not estimated to be located directly ahead of the host vehicle along a straight route, the corrected position data are adjusted in accordance with relative positions and orientations of the target object and host vehicle.

17 Claims, 24 Drawing Sheets

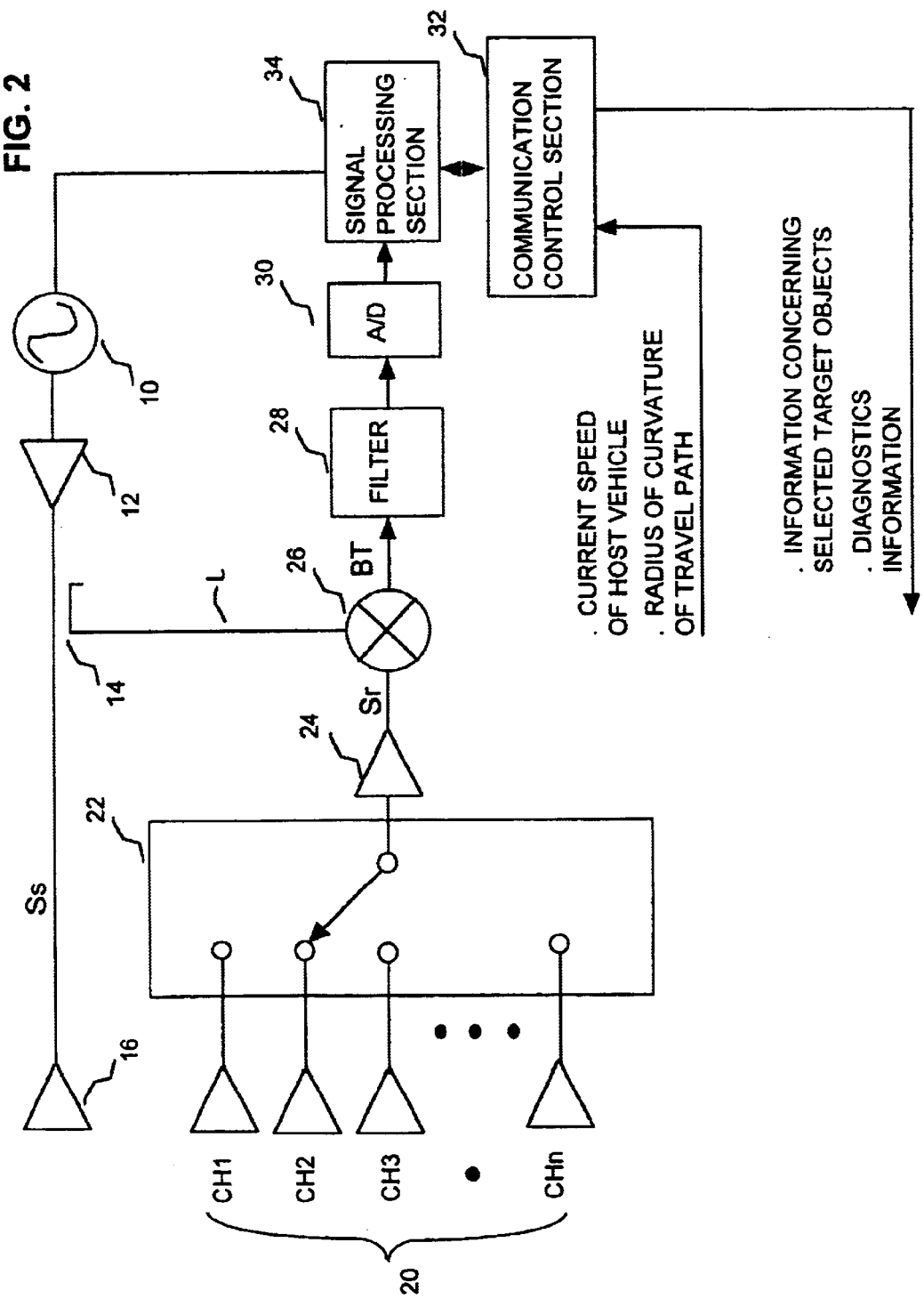

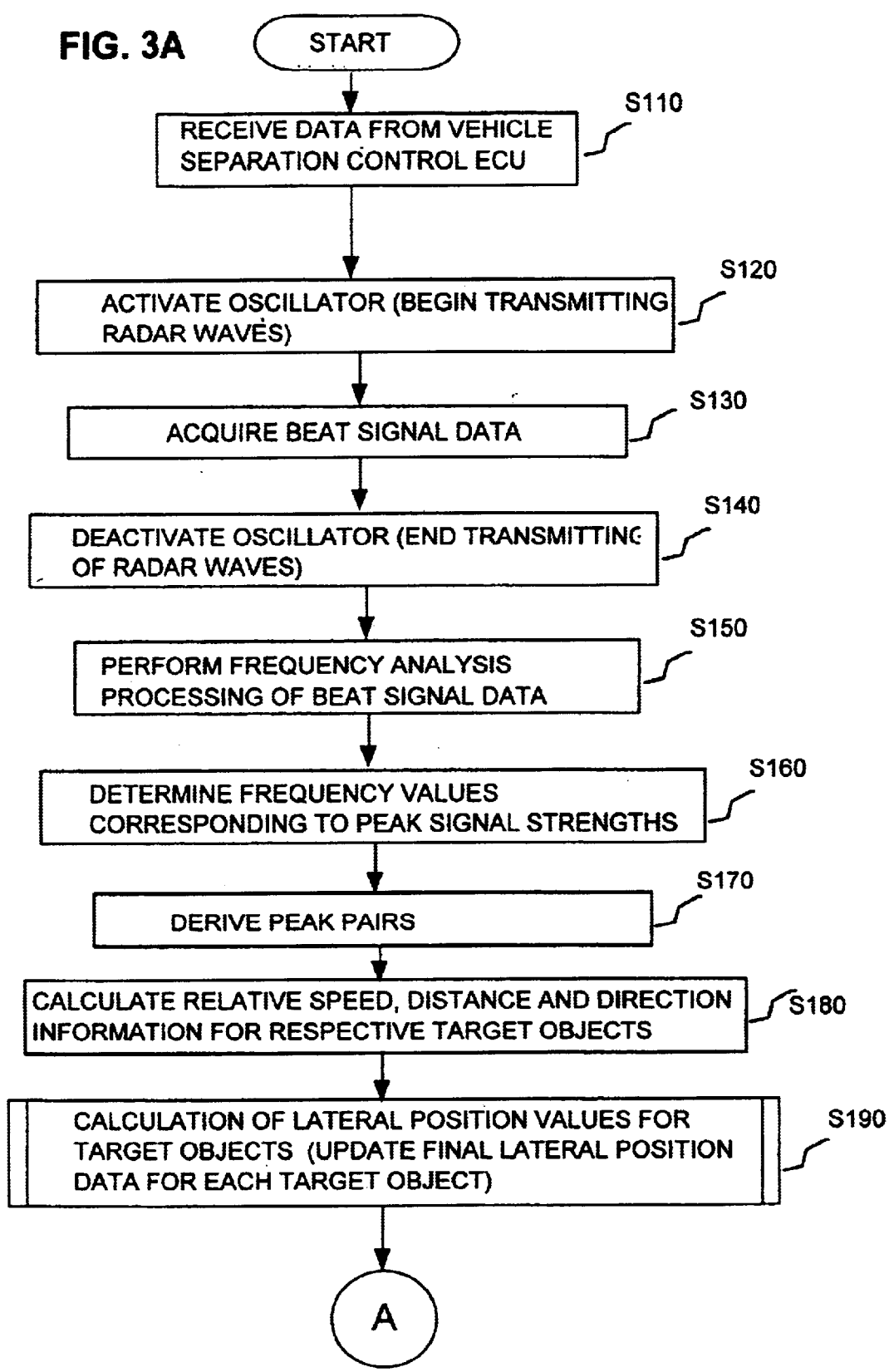

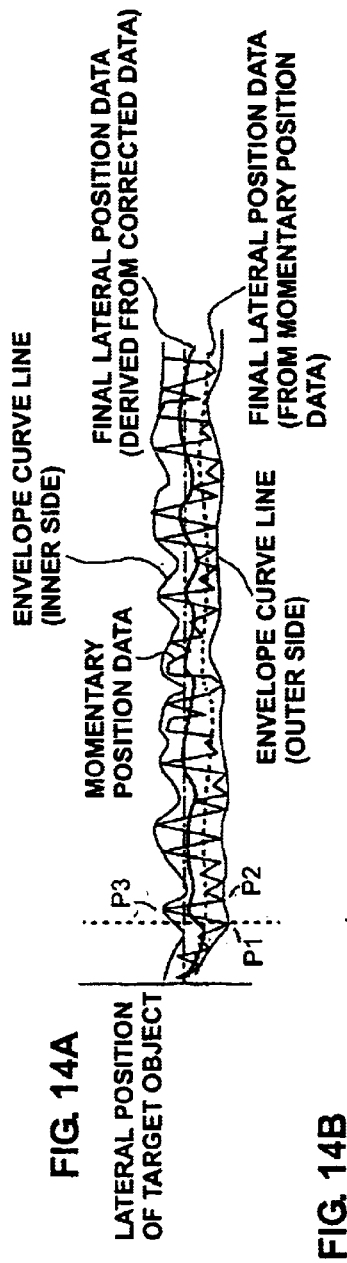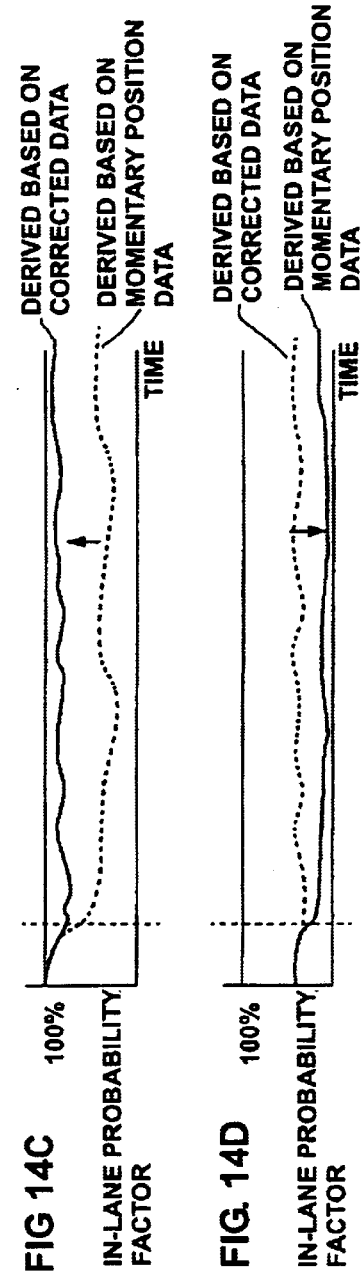

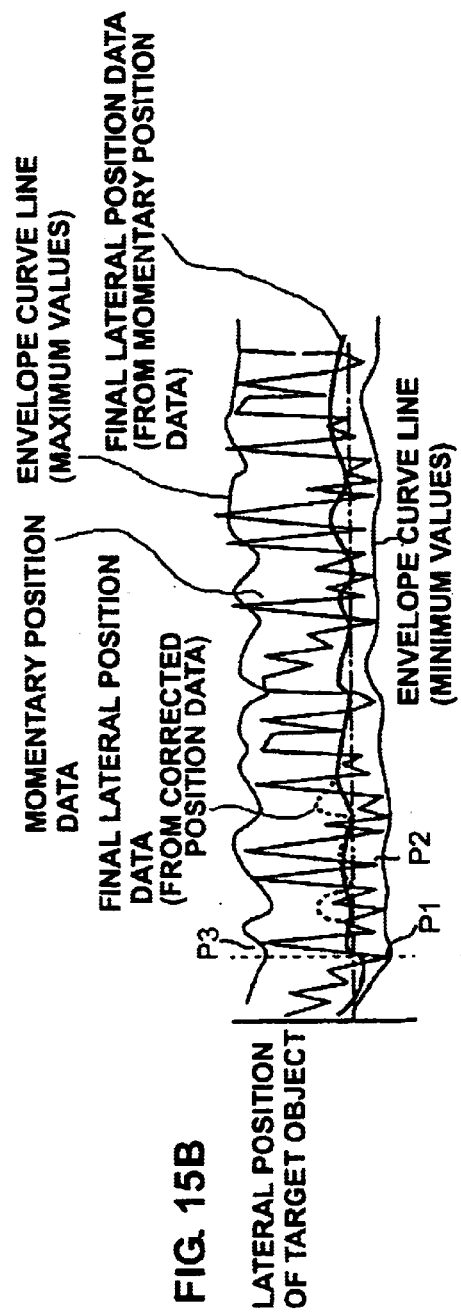
FIG. 15B
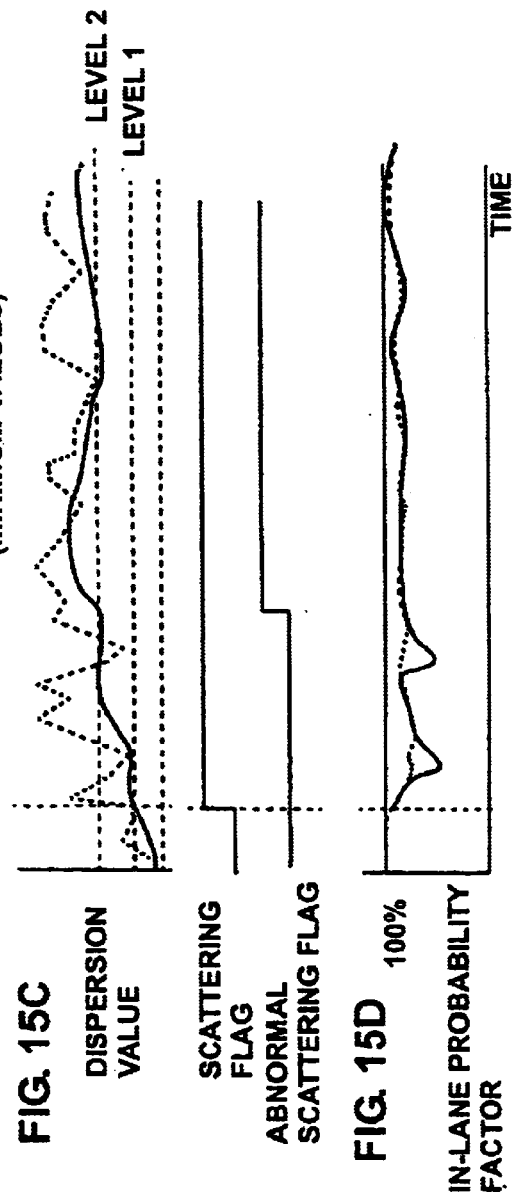
FIG. 15C
FIG. 15D

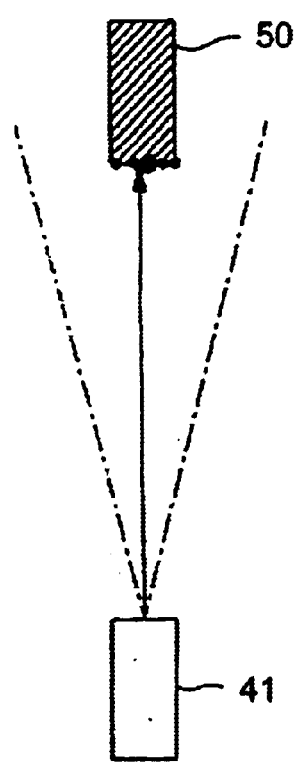
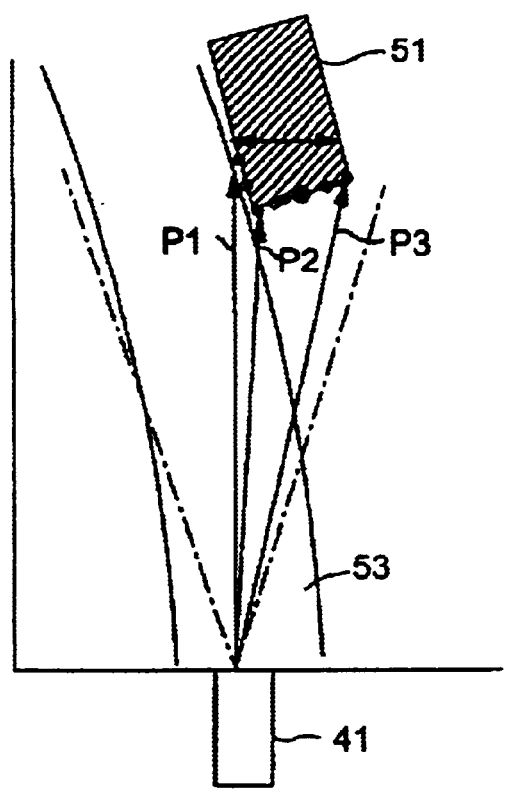
FIG. 18A
FIG. 18B

VEHICLE-MOUNTED RADAR APPARATUS PROVIDING IMPROVED ACCURACY OF DETECTION OF LATERAL POSITION OF PRECEDING VEHICLE

BACKGROUND OF THE INVENTION

1. Field of Application

The present invention relates to a vehicle-mounted radar apparatus for detecting objects such as preceding vehicles, by transmitting and receiving radar waves such as millimeter-range radio waves.

2. Description of Prior Art

In the prior art, types of vehicle-mounted radar apparatus are known which are utilized as part of a vehicle control system such as a cruise control system) for collision prevention or for implementing a "following" function whereby a host vehicle equipped with the radar apparatus is controlled to follow an immediately preceding vehicle with a specific separation distance from that vehicle.

It is basically essential for a vehicle-mounted radar apparatus to be capable of detecting a target object such as a preceding vehicle which is directly in the vehicle lane of the host vehicle or which is moving in an adjacent vehicle lane but partially protrudes into the vehicle lane of the host vehicle, or which is in the process of "cutting in" ahead of the host vehicle (i.e., is moving from an adjacent vehicle lane into that of the host vehicle). To achieve such detection, it is necessary for the radar apparatus to be capable of substantially accurately determining the current lateral position of a target object and also the successive lateral positions which have been attained by that target object up to the current time point. The term "lateral position" of a target object as used herein signifies the lateral position of a width-center location on the target object in relation to a corresponding location on the host vehicle (i.e., lateral with respect to the direction of motion of the host vehicle). The term "width-center location" signifies a location midway between left and right sides of an object, such as a location midway between the opposing sides of a vehicle.

In the following it will be generally assumed that the radar apparatus is of FMCW (Frequency Modulation Continuous Wave) millimeter-wave type, although the principles of the invention are not limited to such a type. Each interval in which a transmitting/receiving operation of the radar apparatus is executed, with reflected waves being thereby received from one or more target objects and processing of resultant received signals then performed, will be referred to as a modulation interval.

As illustrated in the conceptual diagram of FIG. 18A, when a radar apparatus of a host vehicle 41 travelling along a straight path transmits radio waves along the direction indicated by the arrow line, the waves will be reflected from various different parts of a target object positioned directly ahead of the host vehicle, with the target object assumed here to be a preceding vehicle 50. Locations from which the waves may be strongly reflected from the rear end of the preceding vehicle 50 are indicated by the black dots 60. In general the waves will be most strongly reflected from various different parts of the target object, in successive modulation intervals. The received signals resulting from the reflected waves, in a modulation interval, are processed to obtain an estimate of the lateral position of the target object. However the obtained position will be determined by the locations of those portions of the target object from which the strongest reflections occur and so will not necessarily coincide with a width-center location on the preceding vehicle, and these portions from which the strongest reflections occur will change with time (for example, due to variations in the attitude of the target object with respect to the host vehicle).

As a result, when successive estimated lateral positions of a preceding vehicle are derived based upon such received radio waves, these will deviate from the actual lateral positions, with the amount of deviation varying with time. This is illustrated in the example of FIG. 18C, in which the curve "momentary position data" represents a series of estimated lateral position values for a target object such as the preceding vehicle 50, obtained at respective successive modulation intervals. The curve designated "final lateral position data" express a corresponding series of successive estimated lateral positions for that target object which have been obtained by smoothing processing (e.g., low-pass filtering) of the momentary position data. The chain-line curve indicates the corresponding series of actual lateral positions of the target object, i.e., of the width-center location of the target object.

The aforementioned variations in the locations on a preceding vehicle from which the radio waves are reflected back to the radar apparatus are determined by factors such as shapes of the portions from which reflections occur, the materials constituting these portions, undulations in the road surface which affect the attitudes of the vehicles, etc. The strongest reflections will typically occur for example from the rear fender, rear reflector plates, the number plate, rear windshield, etc., of a preceding vehicle. As a result, in many cases, the variations in the momentary position values value may be much more extreme and irregular than for the case illustrated in FIG. 18C. In that case, the final lateral position data which are obtained by smoothing the momentary position data will be unstable, and will deviate substantially from the successive lateral positions attained by the width-center location of the target object.

Such data are therefore not suitable for use by a vehicle control apparatus such as a cruise control apparatus, as a basis for automatic control of the host vehicle.

Furthermore as illustrated in the example of FIG. 18B, the host vehicle 41 may be moving along a vehicle lane 42 which is curved, in which case the orientation of a preceding vehicle will become skewed with respect to the host vehicle. As a result, an immediately preceding vehicle (i.e., which is travelling along the same vehicle lane as the host vehicle) will not be located directly ahead of the host vehicle, and reflected radio waves may be received from a side face of that preceding vehicle. Similarly, when a vehicle is driving in a vehicle lane which is adjacent to that of the host vehicle, such as the preceding vehicle 51 shown in FIG. 18B, then such side reflection waves may also occur. This further increases the amount of error which will be arise in lateral position values which are obtained by simply applying smoothing to the series of momentary position values.

More specifically, with the example of FIG. 18B, radio waves will be strongly reflected from the left side face of the preceding vehicle 51 and from portions of the rear end of that vehicle which are closest to the host vehicle 41. For example, the arrow lines designated P1, P2 in FIG. 18B represent peak levels of reflection, which occur at respectively different times, resulting in corresponding local extreme values of the momentary position data oriented in the leftward lateral direction, as illustrated in FIG. 18D. However a peak-level reflection P3 from the right side of the preceding vehicle 51, i.e., from a part of that vehicle which is farther from the host vehicle than the left-side parts of vehicle 51, results in a substantially smaller local extreme value of the momentary position data, corresponding to the rightward lateral direction.

In such a case, as illustrated in FIG. 18B, if the final lateral position data are simply obtained by smoothing the momentary position data, then the resultant data will not accurately represent the successive lateral positions of the width-center location of such a target object, but will strongly deviate towards the left side of the object (in the graphs of FIGS. 17A, 17B, etc., the downward direction from the central axis of each graph corresponds to the leftward direction of position displacement, and the upward direction corresponds to the rightward direction of position displacement).

As a result of such errors in the lateral position data, it may be impossible to accurately judge whether a preceding vehicle is actually moving along the same vehicle lane as the host vehicle. Hence, it is not possible to safely use such lateral position data in a vehicle control system such as a cruise control system, for effecting automatic control of a host vehicle. This is a basic problem of the prior art.

SUMMARY OF THE INVENTION

It is an objective of the present invention to overcome the above problem by providing a vehicle-mounted radar apparatus for detecting radio waves received from a target object, whereby the accuracy of determining the lateral position of a target object can be substantially improved.

To achieve the above objective, according to a first aspect, the invention provides a vehicle-mounted radar apparatus including momentary position data generating means which periodically processes received signals from reflected radar waves to derive successive estimated momentary lateral position values for a target object (referred to herein simply as momentary position values, with the series of momentary position values obtained up to the current time point referred to as the momentary position data for that target object) and means for smoothing the momentary position values to obtain final lateral position data, i.e., consisting of a series of lateral position values expressing the approximate lateral positions attained by a width-center location on the target object at successive time points, up to the current point. A vehicle-mounted radar apparatus according to the present invention is characterized by including means for deriving from the momentary position data a series of local extreme values of lateral displacement in one direction with respect to the (momentary) direction of travel of the host vehicle (e.g., the rightward lateral direction), referred to herein as local maximum values of the momentary position data, and a series of local extreme values of lateral displacement in the opposite direction (e.g., the leftward direction) referred to herein as local minimum values of the momentary position data.

If the degree of scattering of the momentary position data exceeds a predetermined level, then a series of local extreme values of lateral position values in leftward direction and a series of local extreme values in the rightward direction, in the momentary position data, are respectively smoothed, and averaging of the results is performed to obtain a single series of corrected position values. These corrected position values are then smoothed, in place of the series of momentary position values, to obtain the final lateral position data for the target object.

As described above, a radar apparatus typically estimates the momentary lateral position of a target object as that of a location, on the object, from which radio waves are most strongly reflected at that moment. Thus, the momentary position values may vary in an irregular manner between positions corresponding to the left side of the target object and positions corresponding to the right side, with the difference between the extreme values of the momentary position being approximately identical to the width of the target object. With the present invention, in such a case, rather than simply smoothing the momentary position data to thereby obtain final lateral position data, smoothing is applied to the extreme values of the momentary position data. Preferably, smoothing for deriving the corrected position data is performed by calculating a series of envelope curve line values of the rightward local extreme values (referred to in the following description as maximum values, for brevity of description) and a series of envelope curve line values of the leftward local extreme values (referred to as minimum values). If the vehicles are travelling along a straight path, as in the example of FIG. 18A, then a series of corrected position values can then be obtained as the averages of successive (rightward, leftward) concurrent pairs of envelope curve line values. These corrected position values are then smoothed, to obtain final lateral position data which will not contain large fluctuations in value, in spite of a high degree of scattering of the momentary position data (i.e., whereby there may be a very irregular distribution of the extreme rightward and extreme leftward momentary lateral position values along the time axis).

Specifically, the degree of scattering of the momentary position data is judged, and when that exceeds a predetermined first threshold value then the corrected position data are derived and smoothed, instead of the momentary position data, to obtain the final lateral position data.

Hence, the final lateral position data obtained for a target object such as a preceding vehicle can be used to obtain a more reliable estimate of the degree of probability that the object is located in the vehicle lane of the host vehicle. Thus, when such probability values are used by a vehicle control apparatus for controlling the host vehicle, increased reliability and safety of control can be achieved.

It would be possible to apply averaging directly between the two series of extreme values of the momentary position data, and use the resultant values as the corrected position data. However by first applying smoothing to these two series of extreme values, preferably, by deriving two (i.e., maximum, minimum) corresponding series of envelope curve line values), sudden changes are suppressed, so that corrected position data can be obtained which are stable and free from the effects of noise.

Furthermore, it would be possible to estimate the degree of scattering of the momentary position data based on differences between local maximum and minimum values of the momentary position data, or difference between maximum and minimum envelope curve line values derived from the extreme values. However the degree of scattering is preferably obtained as a statistical calculation of the dispersion value of a fixed number of the most recent successively obtained momentary position values.

With such a vehicle-mounted radar apparatus, when two preceding vehicles are positioned side by side, it is generally impossible to recognized these as separate vehicles, based on the received reflected waves. Thus with the two vehicles detected as a single object, the apparatus may derive a location midway between the two vehicles as being the lateral position of the "object". In addition, the degree of scattering of the momentary position data will be extremely high. Hence, if one of these preceding vehicles is located in the vehicle lane of the host vehicle, that condition will not be accurately detected.

However with the present invention, if the degree of scattering of the momentary position data exceeds a second predetermined threshold value which is greater than the aforementioned first threshold value (i.e., if the degree of scattering substantially exceeds that which would be expected to occur for a single large-size preceding vehicle) then the final lateral position data are derived by directly smoothing the momentary position data. As a result, since in that case the strongest reflections will occur from the preceding vehicle which is in the vehicle lane of the host vehicle (i.e., is closest to the host vehicle), the final lateral position data will be biased towards the width-center location of that preceding vehicle. Hence, greater accuracy of detection can be achieved in such a case, i.e., an appropriate value of in-lane probability factor, representing the degree of probability that a preceding vehicle is located in the vehicle lane of the host vehicle, can be established for the pair of preceding vehicles.

According to another aspect, the invention provides a vehicle control apparatus comprising means for determining that a target object is likely to be a preceding vehicle, and reflection condition judgement means, operating when the target object is selected as being a preceding vehicle, for judging whether the momentary position data are affected by side reflection radio waves which are reflected from a side face of an inner side of the preceding vehicle. With such an apparatus, the corrected position data generating means comprises means for applying weighting coefficients to selectively apply weighting to the series of maximum and series of minimum envelope curve line values, before these are averaged to obtain the aforementioned corrected position data, and weighting coefficient modification means operating when it is judged that the momentary position data are affected by the side reflection radio waves, for modifying the weighting coefficients such as to apply greater weighting to a selected one of the aforementioned series of maximum values and series of minimum values. The selected series corresponds to locations on the preceding vehicle at an outer side, opposite the inner side.

In such a case in which side reflection waves are received by the radar apparatus from a preceding vehicle, the degree of scattering of the momentary position data will generally be sufficiently high that (as described above) the corrected position data will be selected to be smoothed for deriving the final lateral position data. However with the above aspect of the invention, compensation is applied to the corrected position data against the deviation which would otherwise occur due to the effects of the side face reflections upon the momentary position data.

The "inner" side of a preceding vehicle can simply be determined as the side which is closest to the host vehicle, i.e., when the preceding vehicle is running in an adjacent vehicle lane, or is located in the same vehicle lane as the host vehicle, but with that vehicle lane being shaped with a significant degree of curvature.

The weighting coefficients are preferably selectively determined not only in accordance with the side of the preceding vehicle from which side face reflections are likely to be occurring, but also the relative positions/orientations of the host vehicle and preceding vehicle. That is to say, respectively different weighting coefficients may be utilized, depending upon whether the preceding vehicle is located in an adjacent vehicle lane, or is in the same lane as the host vehicle with that lane having a significant degree of curvature.

According to another aspect, the aforementioned momentary position data generating means comprises normalization means for performing normalization calculation processing to convert each of the successively obtained momentary position values to respectively corresponding normalized momentary position values. Each of these normalized momentary position values corresponds to a condition of the vehicle lane(s) being oriented along a straight line which is parallel to the (momentary) travel direction of the host vehicle.

Specifically, each momentary (lateral) position which is estimated for a target object, based on the received radar signals, is shifted laterally by an amount which is determined based on the radius of curvature of the vehicle lane of the host vehicle and the relative distance and direction of the target object. By applying such normalization to the momentary position data, all subsequent processing, including derivation of the final lateral position data, can be executed as if the host vehicle and preceding vehicles were always moving along a completely straight route. Since it is not necessary to apply compensation for the degree of curvature of the travel path each time that new lateral position data are derived, the processing is thereby substantially simplified.

According to another aspect, the apparatus includes means for estimating the width of a target object, as the width of scattering of the momentary position data. This is advantageous for the following reasons. The final lateral position data express only the successive lateral positions of the width-center location of a target object. However if the width of a preceding vehicle can be derived, then for example it becomes possible to judge the occurrence of a condition in which a preceding vehicle which is driving in a vehicle lane adjacent to that of the host vehicle is of such a size that it may be partially protruding into the lane of the host vehicle.

It would be possible for the scattering width to be obtained simply as a difference between a pair of extreme (maximum, minimum) values of the momentary position data. However with the present invention, the width of scattering is preferably obtained as an average amount of difference between aforementioned maximum envelope curve line values and minimum envelope curve line values.

According to another aspect, the apparatus includes means for assigning a target object to one of a plurality of predetermined size categories, based on the estimated width of the target object, for example a "normal-size vehicle" category, "large-size vehicle" category, "motor cycle" category, etc. When such information is supplied to a vehicle control apparatus of the host vehicle, then more effective countermeasures against collision can be implemented, based on the estimated size of the target object, e.g., measures such as multi-stage control of opening of an air bag, etc.

Furthermore when such a vehicle-mounted radar apparatus is used in conjunction with a vehicle control apparatus such as a cruise control system, the radar apparatus can transmit, to the cruise control system, information indicating when a degree of scattering of the momentary position data for a target object is excessively high. In that case the cruise control system can be advantageously configured such that when a target degree of acceleration is established for controlling the host vehicle in relation to that target object, the target degree of acceleration is reduced if the degree of scattering of the momentary position data is excessive. This ensures increased safety of control, since a high degree of scattering of the momentary position data may indicate a low level of reliability of the position information which has been derived for the target object.

Each of the various means used to perform the above functions of a vehicle-mounted radar apparatus according to the present invention of the invention, other than radio wave transmitting and receiving functions, are preferably implemented by a program executed by a computer, for example as respective subroutines of a main program routine which is periodically executed by the computer.

Such a program could be stored on various types of data storage medium which can be read by a computer, such as floppy disk, MO disk, DVD, CD-ROM, computer hard disk, memory card, etc., such that the program can be read out from the storage medium and loaded into the computer when required, to be executed. Alternatively, the program could be stored in a ROM or in a backup RAM of the computer. Furthermore the invention is not limited to the case of the program being stored in a storage medium, and the program could for example be transmitted to the computer via a data transfer network and loaded into the computer.

BRIEF DESCRIPTION OF THE DRAWINGS

FIG. 2 is a general system block diagram of the vehicle-mounted radar apparatus embodiment;

FIGS. 3A, 3B constitute a flow diagram of main processing which is periodically executed by a signal processing section of the embodiment, for processing received signals resulting from reflected radio waves;

FIGS. 14A to 14D are graphs showing examples of variation of respective parameters with respect to time, for conditions such as those illustrated in FIGS. 13A, 13B;

FIGS. 15B to 15D are graphs showing examples of variation of respective parameters with respect to time, for a conditions such as that illustrated in FIG. 15A;

FIGS. 18A, 18B, 18C, and 18D are diagrams for illustrating problems of deriving lateral positions of a preceding vehicle based on reflected radio waves, in the prior art.

DESCRIPTION OF PREFERRED EMBODIMENTS

Figure 1A:
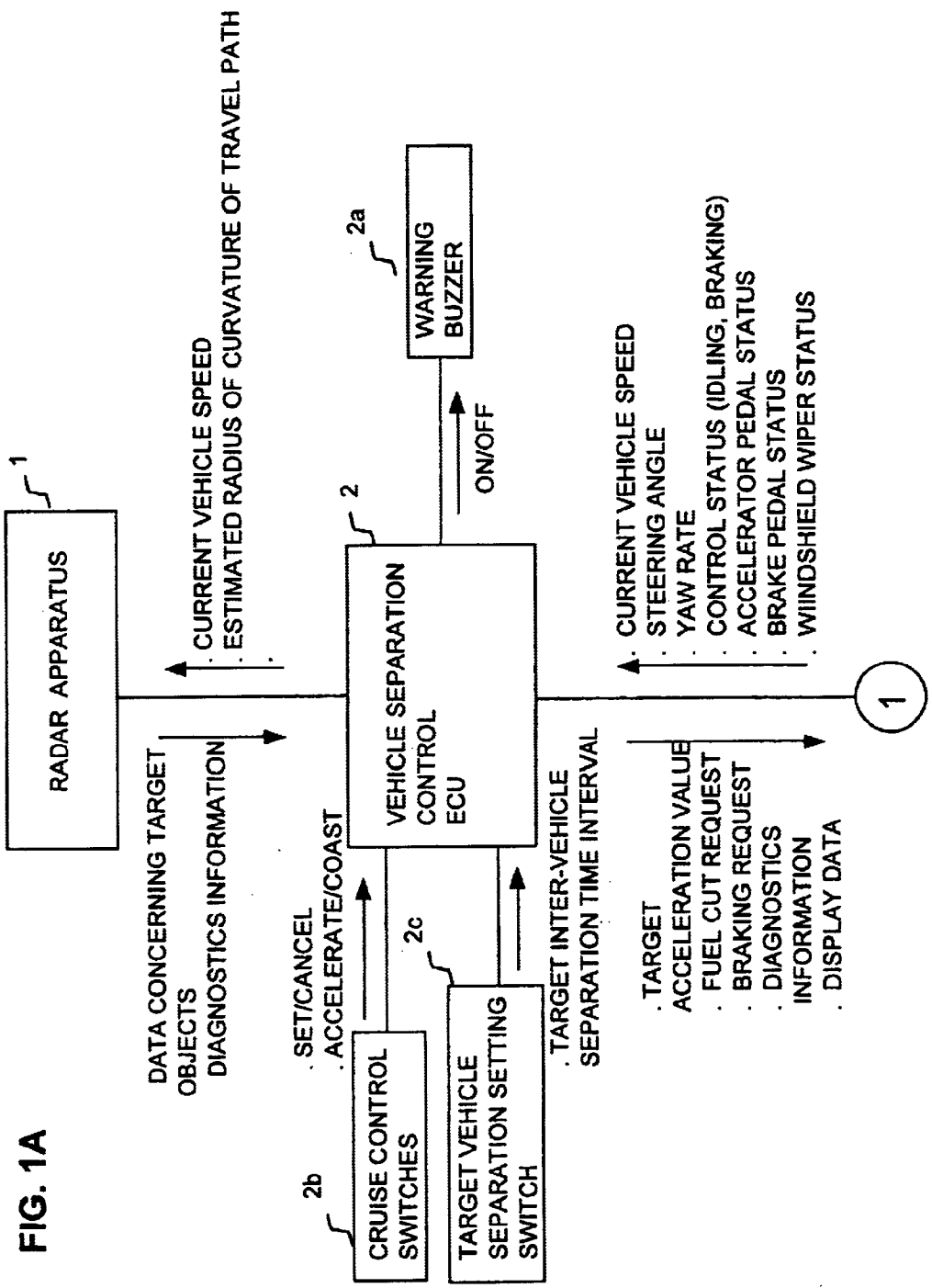
FIGS. 1A, 1B constitute a general system block diagram of an example of a cruise control system which incorporates an embodiment of a vehicle-mounted radar apparatus.
Figure 1B:
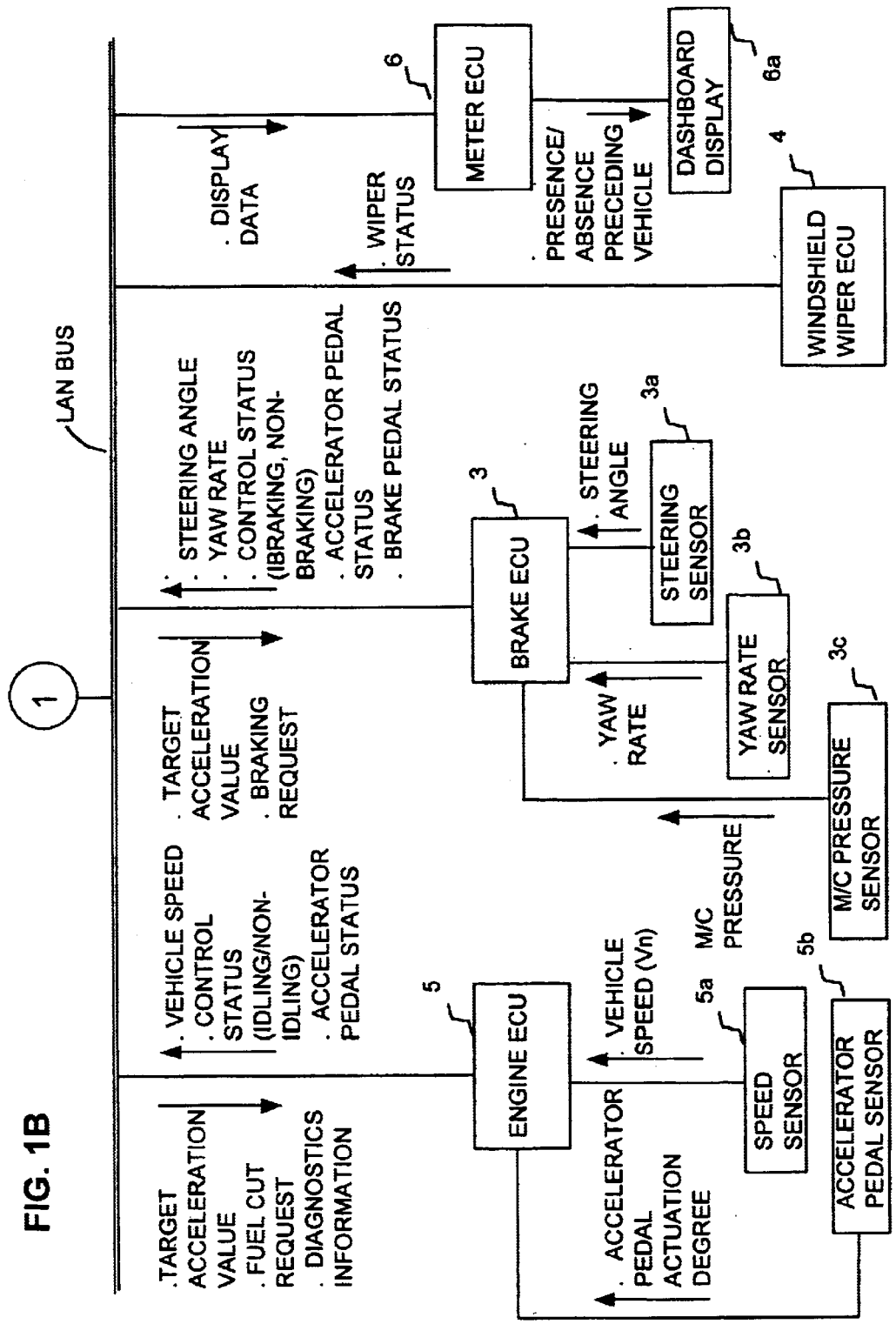

FIGS. 1A, 1B constitute a general system block diagram of a cruise control system which incorporates an embodiment of a vehicle-mounted radar apparatus according to the present invention, and which is configured for performing automatic control of a host vehicle based on data concerning detected target objects, generated by the radar apparatus. In the following, unless otherwise indicated, "the system" refers to the cruise control system. The system is based on a vehicle separation control electronic control unit 2 (with "electronic control unit" being abbreviated to ECU in the following), which is connected to a brake ECU 3, a windshield wiper ECU 4, an engine ECU 5, and a meter ECU 7 via a LAN (Local Area Network) data communication bus, and is further connected directly to cruise control switches 2b, a target vehicle separation setting switch 2c, a warning buzzer 2a and a vehicle separation control ECU 2. Data communication between the ECUs of this embodiment via the LAN communication bus is performed using the CAN (Controller Area Network) protocol (proposed by the Robert Bosch company, Germany) which is commonly used in automobile data communication networks.

The vehicle separation control ECU 2 is connected to the radar apparatus 1, the warning buzzer 2a, and the target vehicle separation setting switch 2c. In this embodiment, the radar apparatus 1 is a millimeter-wave radar apparatus which is of FMCW (Frequency Modulation Continuous Wave) type. Such a radar apparatus transmits frequency modulated radio waves in the millimeter wavelength range, for detecting target objects such as preceding vehicles, objects at the roadside, etc. The data thus obtained concerning target objects are transmitted to the vehicle separation control ECU 2, together with diagnostics information concerning the functioning of the radar apparatus 1 itself. The data concerning target objects include information such as respective positions (i.e., as indicated by lateral position data) of the target objects, vehicle probability factor information (described hereinafter) for each target object, scattering flag status, and abnormal scattering flag status, (also described hereinafter).

The brake ECU 3 is based on a microcomputer, which receives information from the steering sensor 3a which indicating the steering angle of the host vehicle, receives information from the yaw rate sensor 3b indicating the yaw rate of the vehicle, and transmits information specifying the brake pedal status to the vehicle separation control ECU 2 via the LAN communication bus. The brake pedal status information is derived from a master cylinder pressure signal that is supplied from a master cylinder pressure sensor 3c, expressing the status of an actuator which controls an increase-pressure control valve and decrease-pressure control valve in the brake hydraulic circuit, for controlling the brake pressure.

The engine ECU 5 is based on a microcomputer, which receives sensor signals from a vehicle speed sensor 5a that detects the current speed of the host vehicle and from an accelerator pedal sensor 5b which detects the degree of actuation of the accelerator pedal. Based on these sensor signals, the engine ECU 5 transmits data expressing the current vehicle speed, the control status of the engine (i.e., which may be an idling status, or the engine may be in a condition of being controlled to run the vehicle at a target speed) and the accelerator pedal status (obtained from the accelerator pedal sensor 15, indicating the degree of actuation of that pedal) to the vehicle separation control ECU 2. The engine ECU 5 receives, from the vehicle separation control ECU 2, data expressing a target acceleration value, fuel cut commands, diagnostics information, etc., and judges the current operating condition of the engine based on all of these data. The engine ECU 5 thereby outputs drive commands, in accordance with that current operating condition, to a throttle actuator (not shown in the drawing) that controls the degree of opening of the throttle valve of the engine. With this embodiment, it is assumed that the vehicle engine is a gasoline-powered engine.

The windshield wiper ECU 4 controls driving of the windshield wipers, and sends windshield wiper switch information to the vehicle separation control ECU 2. The meter ECU 6 controls the dashboard meters 6a to display various information such as the vehicle speed, the engine speed of rotation, the open/close status of the doors, the shift range of the gearbox, etc.

The vehicle separation control ECU 2 receives the control status signals described above from the engine ECU 5, and also receives control status information from the brake ECU 3 expressing the steering angle, yaw rate of the host vehicle, brake control status, etc., and data expressing the windshield wiper status from the windshield wiper ECU 4. In addition, as described above, the vehicle separation control ECU 2 receives information transmitted from the radar apparatus 1 concerning a set of target objects which have been selected by the radar apparatus 1 as being respective preceding vehicles, with the information including, for each of these target objects, the aforementioned in-lane probability factor, the distance and the relative speed of the target object. Based on that information, the vehicle separation control ECU 2 determines whether there is a target object which is judged to be a preceding vehicle for which it is necessary to apply inter-vehicle separation distance control.

If it is found that there is such a preceding vehicle, and the host vehicle is currently operating under cruise control, then the vehicle separation control ECU 2 generates control commands for accelerating or decelerating the host vehicle such as to appropriately adjust the distance between the host vehicle and the preceding vehicle. These control commands may specify a target value of acceleration or deceleration and/or or a fuel cut request, transmitted together with diagnostics information to the engine ECU 5, while in addition a control command specifying a braking request and control information, etc., may be transmitted to the brake ECU 3, and display data may be transmitted to the meter ECU 7. In addition, the vehicle separation control ECU 2 judges whether it is necessary to generate an audible warning, and if so, sends a command to the warning buzzer 2a to cause an audible warning to be emitted.

The cruise control switches 2b are made up of a "cruise set" switch which is operated by means of a cruise set lever, a "cruise cancel" switch which is operated by means of a cruise cancel lever, a "set vehicle speed fine adjustment increase" switch, a "set vehicle speed fine adjustment decrease" switch, etc. The "cruise set" switch is actuated to begin automatic cruise control operation, when the main switch is in the ON state. The "cruise cancel" switch is actuated to terminate cruise control operation.

In general, the "set vehicle speed fine adjustment increase" switch is operated by a lever referred to as the accelerator lever, i.e., when the accelerator lever is actuated, the switch is set ON, whereby a stored value of set vehicle speed (i.e., stored in a memory of the vehicle separation control ECU 2, not shown in the drawings) is gradually increased. The "set vehicle speed fine adjustment decrease" switch is generally operated by a lever referred to as the coast lever, i.e., when the coast lever is actuated, the switch is set ON, whereby the stored value of set vehicle speed is gradually decreased.

During cruise control operation, the target vehicle separation setting switch 2c can be used by the driver to input to the vehicle separation control ECU 2 information for setting a target time interval (referred to in the following as the target vehicle separation interval) which is a time interval corresponding to a target value of inter-vehicle distance between a preceding vehicle and the host vehicle at the current vehicle speed. The target vehicle separation interval can be set within a predetermined range of values, and the current set value is held stored in the vehicle separation control ECU 2.

The general configuration of the radar apparatus 1 is shown in the system block diagram of FIG. 2. As shown, the radar apparatus 1 includes a VCO (voltage controlled oscillator) 10 which generates a high-frequency signal of fixed amplitude, having a frequency in the millimeter-wave range, with the frequency alternating between a condition of successively increasing linearly and a condition of successively decreasing linearly, in successive time intervals. That is to say, the frequency is modulated with a sawtooth variation along the time axis. The radar apparatus 1 further includes an amplifier 12 which amplifies the high frequency output signal from the VCO 10, a power splitter 14 which splits the output signal power from the amplifier 10 to obtain a transmission signal Ss and a local oscillator signal L, a transmission antenna 16 which is driven by the transmission signal Ss to transmit radar waves (i.e., millimeter wavelength radio waves), and a receiving antenna array 20 which receives resultant reflected radar waves and is formed of n receiving antennas, where n is a fixed plural integer.

The radar apparatus 1 further includes a received signal switch 22, which successively selects respective antennas of the array of receiving antennas 20, with the received signal from a currently selected receiving antenna being supplied to an amplifier 24. The resultant amplified received signal, designated as Sr, is supplied to one input of a mixer 26, while the mixer signal L is supplied to the other input of the mixer 26. A beat signal BT is thereby produced from the mixer 26, which is supplied to a filter 28 to remove unwanted frequency components, and the resultant filtered signal is subjected to sampling and conversion to digital data by an A/D (analog-to-digital) converter 30. The radar apparatus 1 moreover includes a communication control section 32 which controls communication with external devices (and in particular, with this embodiment, communication with the vehicle separation control ECU 2). The radar apparatus 1 also includes a signal processing section 34, which effects control to periodically start the oscillation operation of the VCO 10 and to halt that oscillation operation, and which also controls the sampling of the filtered beat signal BT by the A/D converter 30, performs processing of the resultant digital signal, and controls transmitting and receiving of information (e.g., host vehicle speed, radius of curvature of vehicle lane, etc.) which are necessary for that processing and information (e.g., target object information, diagnostics information) which is obtained as a result of that processing. The transmitting and receiving of such information by the signal processing section 34 is executed via a communication control section 32, as indicated.

Each of the n antennas of the receiving antenna array 20 is configured with a beam width which contains the entire beam width of the transmission antenna 16, and these antennas of the receiving antenna array 20 are allocated to respective receiving channels which are designated as CH1 to CHn. The signal processing section 34 is based on a microcomputer, and is equipped for executing processing which includes high-speed Fourier transform processing of the data which are obtained from the A/D converter 30.

With this embodiment, the signal processing section 34 receives data directly expressing the radius of curvature of the vehicle lane of the host vehicle, from the communication control section 32. However it would be equally possible to configure the apparatus such that, instead of receiving such information expressing the radius of curvature of the vehicle lane, the signal processing section 34 receives information including the steering angle from the steering sensor 3a, and information expressing the current location of the host vehicle and the current location and environment of the host vehicle (provided by a vehicle navigation apparatus, not shown in the drawings). The signal processing section 34 could utilize that information, in combination with information derived internally by the signal processing section 34 concerning external stationary objects (i.e., detected objects which are not in motion) to calculate the radius of curvature of the vehicle lane.

When the VCO 10 is activated in response to a command from the signal processing section 34, the VCO 10 begins to generate the high-frequency signal which is amplified by the amplifier 12, and subjected to power splitting by the power splitter 14, to thereby produce the transmission signal Ss and the local oscillator signal L. The transmission signal Ss is supplied to the antenna 16, to transmit the radar waves. The resultant reflected radio waves from one or more target objects are received by all of the antennas of the receiving antenna array 20. However only the receiving signal Sr from the receiving channel Chi (where i=1 to n) which is currently selected by the received signal switch 22 is amplified by the amplifier 24 and supplied to the mixer 26. The mixer 26 mixes the received signal Sr with the local oscillator signal L to thereby produce the beat signal BT, and after unwanted frequency components have been removed by the filter 28, the beat signal BT is supplied to the A/D converter 30 to be sampled, with the resultant digital data being supplied to the signal processing section 34.

The received signal switch 22 selects each of the receiving channels CH1 to CHn a predetermined number of times (e.g., 512 times) within each modulation interval of the radar waves, and the A/D converter 30 performs sampling in synchronism with these switching timings of the received signal switch 22. That is to say, within each modulation interval, respective sets of data are derived from each of the channels CH1 to CHn, and supplied to the signal processing section 34.

Figure 3B:
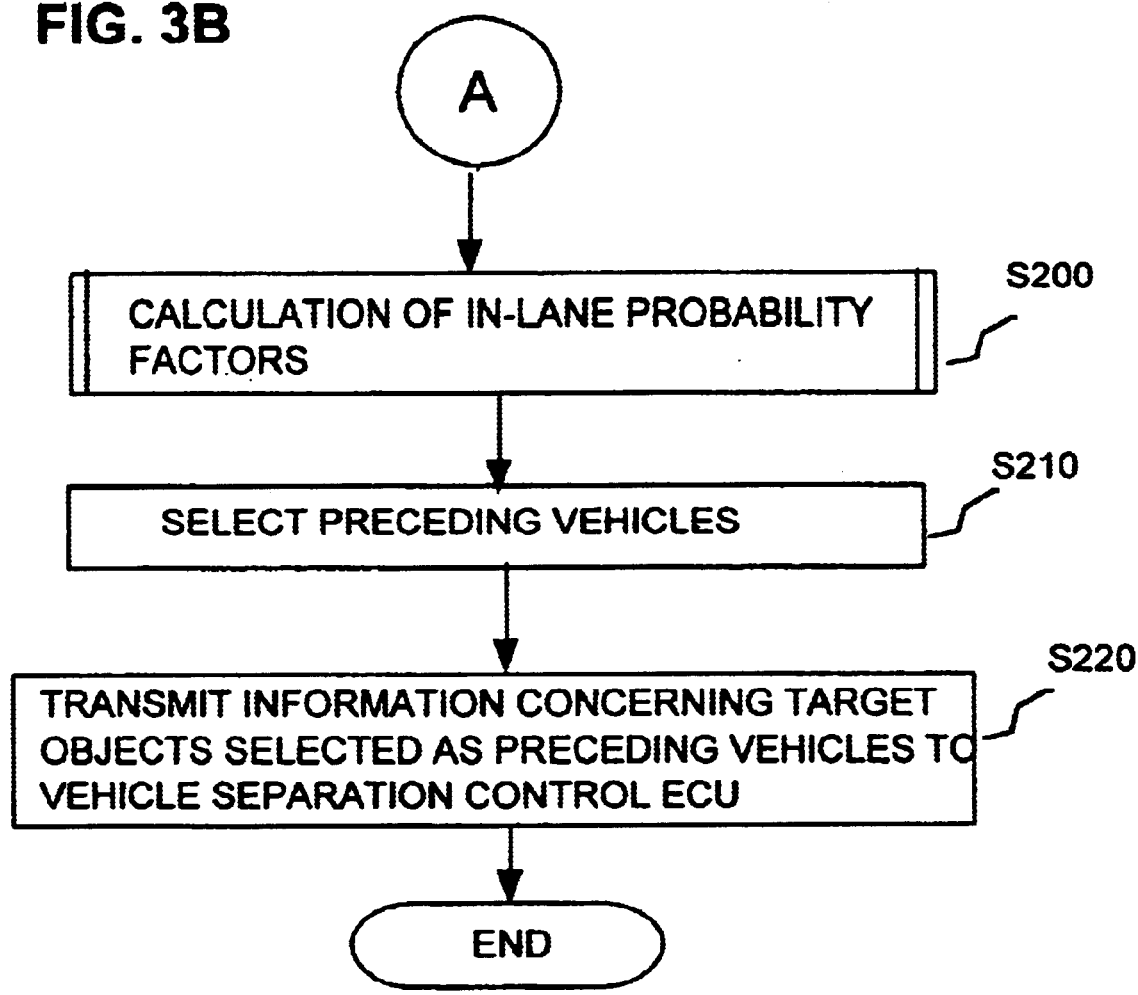

The processing routine which is executed by the signal processing section 34 will be described referring to the flow diagram of FIG. 3. With this embodiment, firstly, when information expressing the speed of the host vehicle and the radius of curvature of the vehicle lane are received by the signal processing section 34 via the communication control section 32 (step S110) the oscillator 10 is activated whereby transmission of radar waves begins (step S120) and digital sample values of the beat signal BT are thereby acquired from the A/D converter 30 (step S130). When a requisite number of sample values have been acquired, the operation of the oscillator 10 is halted, thereby halting transmission of radar waves (step S140).

Next, frequency analysis processing (which with this embodiment consists of FFT processing) is applied to the sample values which have been read in. For each of the channels CH1 to CHn, a first power spectrum of the beat signal BT is derived corresponding to the intervals in which the radar wave frequency is increasing and a second power spectrum is derived corresponding to the intervals in which the frequency is decreasing (step S150).

Each of these power spectrums is then analyzed to determine frequencies at which peak values of signal power are attained (step S160). Peak values obtained for all of the spectrums corresponding to the intervals of increasing radar wave frequency are then combined into respective single peak values, and respective corresponding single peaks are similarly obtained for the intervals of decreasing radar wave frequency, and these are combined to obtain one or more peak pairs which correspond to respectively different target objects (S170). Information concerning the relative speed, distance, and angular direction of each of these target objects is then derived (step S180). Methods of deriving such information by use of FMCW radar are well known, and do not relate to the basic features of the present invention, so that detailed description will be omitted.

Based on the information which is obtained in step S180, a lateral position calculation processing subroutine is then executed, to obtain respective estimated lateral positions for each for each of the detected target objects. The lateral position value thus obtained for a target object is recorded as part of a series of such values, constituting a set of data referred herein as the final lateral position data for that target object. Each lateral position value expresses the estimated lateral position of the width-center location of a target object (step S190). The (updated) final lateral position data thus generated for each of the detected target objects are then used, in conjunction with information obtained from the vehicle separation control ECU 2 in the previously executed step S110, to derive respective in-lane probability factors for each of the target objects (step S200). The in-lane probability factor for a target object is the estimated degree of probability (e.g., expressed as a percentage) that the object is located in the vehicle lane of the host vehicle.

Based on the information thus obtained, including the respective in-lane probability factors for each of the detected target objects, a judgement is then made to select each target object for which it may be necessary to apply vehicle separation control (i.e., by the vehicle separation control ECU 2) (step S210). This judgement is made based on the respective values of in-lane probability factor which have been derived for each of these target objects. Although such a target object may not necessarily be a vehicle, the target objects which are selected in step S210 will be referred to in the following as the "selected preceding vehicles". Information concerning the selected preceding vehicles is then transmitted via the communication control section 32 to the vehicle separation control ECU 2 (step S220). This completes the processing of this routine.

Details of the lateral position calculation processing of step S190 will be described referring to the flow diagram constituted by FIGS. 4A, 4B. This processing is applied respectively separately to each of the target objects for which information is derived in step S180.

In this processing, firstly the distance and angular direction values for the target object, obtained in step S180, are used directly to estimate a lateral position of the target object (step S310. A series of such directly estimated values, successively derived up to the current point in time, are referred to as the momentary position data for that target object.

The momentary position data which are thereby obtained are then normalized, by applying a coordinate transform operation such that the host vehicle can be considered to be travelling along a straight line (step S320).

That is to say, the momentary position data express the lateral position of the target object with respect to a specific location on the host vehicle, e.g., the width-center location at the front end of the host vehicle, as a position reference. For example referring to the example of FIG. 16A, a preceding vehicle 45 is positioned displaced laterally from the host vehicle 41 by an amount X, and (if normalizing processing of the vehicle lane were not applied) would be judged to be located within the range of lateral positions whereby it is in the vehicle lane of the host vehicle. However the preceding vehicle 45 is actually travelling along an adjacent highway lane to that of the host vehicle 41, which is moving along a curved route 42. Thus, it is not possible to derive the in-lane probability factor for a preceding vehicle directly from the momentary position data alone. For that reason, normalizing is performed by applying correction of each obtained momentary position value by the lateral amount X', with that correction amount being calculated based on the (momentary) travel direction of the host vehicle 41, the estimated distance Y and angular direction of the preceding vehicle 45 (each derived by the radar apparatus 1 for a target object, in conjunction with deriving a momentary position value for that target object), and the radius of curvature of the vehicle lane (supplied from the vehicle separation control ECU 2).

That is to say, the estimated lateral distance between the width-center location of the vehicle 45 and the vehicle lane of the host vehicle 41 is corrected from X to (X+X'), as a normalized momentary position value. The in-lane probability factor for the target object 45 can then be directly obtained. It will be apparent that the derivation of X' is a simple geometric calculation.

In the following unless otherwise indicated, "momentary position value" is to be understood as signifying a normalized momentary position value, and the term "momentary position data" is to be understood as signifying a series of normalized momentary position values, obtained successively up to the current time point.

Next, a fixed number the of momentary position values which have been derived up to the current point (including the most recently obtained value) for this target object, are extracted and a dispersion value is calculated for that set of data (step S330). The dispersion value is obtained through a usual type of statistical calculation, and is used as an indication of the degree of scattering of the lateral positions expressed by the momentary position data.

A decision is made as to whether the dispersion value thus obtained is greater than a predetermined threshold value designated as Level 1 (step S340). If the dispersion value is less than or equal to Level 1, then a pair of flag bits referred to as the Scatter Flag and the Abnormal Scattering Flag are each cleared (step S350). Operation then proceeds to step S420. However if it is found in step S340 that the dispersion value is higher than Level 1, then the Scatter Flag is set (step S360) and a decision is made as to whether the dispersion value obtained in step S330 exceeds a predetermined value designated as Level 2 (>Level 1) (step S370). If the dispersion value exceeds Level 2, then the Abnormal Scattering flag is set (step S380) and operation proceeds to step S420. The Level 1 and Level 2 values correspond respectively to a first reference value and a second reference value as set out in the appended claims of this invention.

If it is found in step S370 that the dispersion value is less than Level 2, then envelope curve line calculation processing is applied to the momentary position data, to obtain a series of maximum envelope curve line values (as described hereinafter) and minimum envelope curve line values (subroutine S390). Based on the calculation results thus obtained, the width of the target object is estimated, and the target object is assigned to one of a plurality of width categories. (subroutine S400).

The series of maximum envelope curve line values and series of minimum envelope curve line values obtained in step S390 are then combined by weighted averaging, to derive a corresponding series of corrected position values (subroutine S410).

Next, a decision is made as to whether the scattering flag is set (step S420). If it is not set, then the momentary position data are used in deriving a final lateral position value corresponding to the current time point (S450). Specifically smoothing processing by low-pass filtering s applied to the series of momentary position values obtained up to the current point for this target object, to obtain a corresponding series of smoothed values, and the smoothed value corresponding to the current time point is then recorded as the final lateral position value obtained in this execution of the subroutine.

However if it is found in step S420 that the scattering flag is set, then a decision is made as to whether the abnormal scattering flag is set (step S430). If that flag is also set, then step S450 is executed as described above to derive a final lateral position value from the momentary position data.

If it is found in step S430 that the abnormal scattering flag is not set, then the corrected position data are selected for use in deriving a new lateral position value, i.e., smoothing by low-pass filtering is applied the series of corrected position values which have derived up to the current point, to obtain a corresponding series of smoothed values, and the smoothed value corresponding to the current time point is then recorded as the final lateral position value obtained in this execution of the subroutine (step S440).

In that way, if the condition [dispersion value≦Level 1 or ≧Level 2] is satisfied, then the final lateral position value is derived by smoothing processing i.e., low-pass filtering of the momentary position data, while otherwise the final lateral position value is derived by smoothing processing of the corrected position data.

Figure 5:
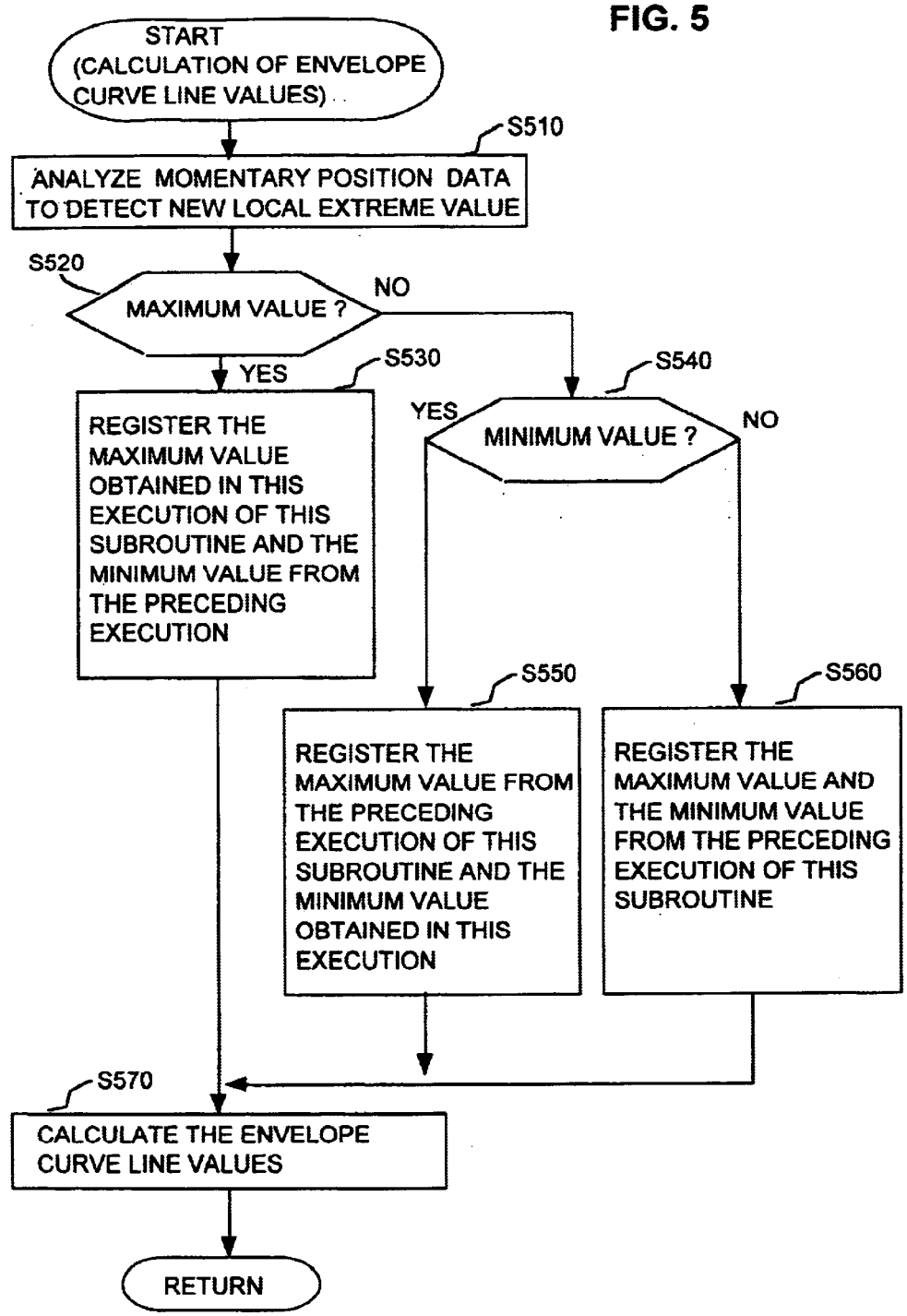
FIG. 5 is a flow diagram of envelope curve line calculation processing which is executed as part of the main processing executed by the signal processing section.

The envelope curve line calculation processing executed in the subroutine S390 will be described referring to the flow diagram of FIG. 5. In the following, for brevity of description of FIGS. 14A, 15B, etc., the term "maximum value" of the momentary position data is used to signify a local maximum value of displacement of lateral position of the target object, as expressed by the momentary position data, (e.g., the rightward direction, with respect to the width-center location and travel direction of the host vehicle). The term "minimum value" of the momentary position data is similarly used to signify a local maximum value of displacement as expressed by the momentary position data, in the opposite direction (e.g., the leftward direction).

Firstly, maximum value calculation processing is applied to the momentary position data obtained up to the current point, to judge whether a new local extreme value of the momentary position data has occurred (step S510). Based on the results, a decision is made as to whether a maximum value of the momentary position data has newly occurred (step S520). If a maximum value has newly occurred, then that is recorded as being the maximum momentary position value obtained for this execution of the subroutine S390, and the minimum value of momentary position data from the preceding execution of the subroutine is left recorded, unchanged, as the minimum value obtained for this execution (step S530).

However if a maximum value has not newly occurred, a decision is made as to whether a minimum value of the momentary position data has newly occurred (step S540). If a minimum value has newly occurred, then that is recorded as being the minimum momentary position value obtained for this execution of the subroutine, and the maximum value of momentary position data from the preceding execution of the subroutine is left recorded, unchanged, as the maximum value obtained for this execution (step S550).

If neither a maximum value nor a minimum value of the momentary position data has newly occurred, then the maximum value and minimum value of momentary position data from the preceding execution of the subroutine are each left recorded, unchanged, as the maximum and minimum value obtained for this execution (step S560).

Figure 17A:
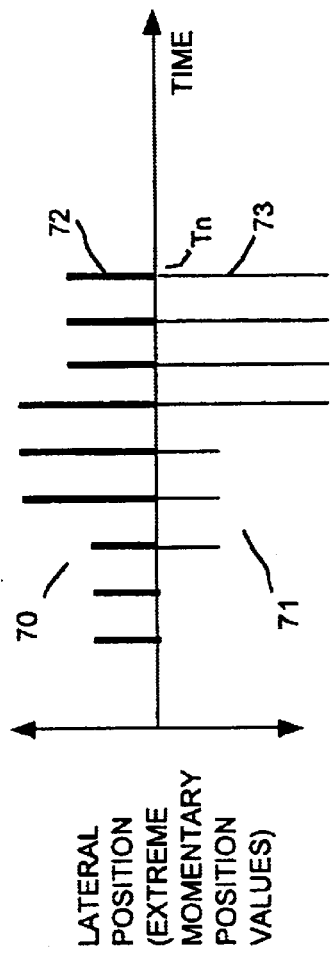
FIG. 17A is a timing diagram conceptually illustrating a series of successively registered local extreme values of the momentary position data.

As a result, as illustrated in the simplified timing diagram of FIG. 17A, a series of maximum values 70 (e.g., local extreme values in the rightward direction) and a series of minimum values 71 (e.g., local extreme values in the leftward direction) are successively registered. For example the maximum value 72 and minimum value 73 are registered at the execution of the subroutine S390 which occurs at time Tn, i.e., pairs of concurrent (maximum, minimum) values are registered successively.

Finally, the series of maximum values which have been registered up to the current point are subjected to smoothing processing to obtain a corresponding series of maximum envelope curve line values, and the series of minimum values registered (e.g., the series 74 shown in FIG. 17B) and the series of registered minimum values are similarly smoothed to obtain a corresponding series of minimum envelope curve line values (e.g., the series 75 shown in FIG. 17B) (step S570). Execution of this subroutine then ends.

Figure 6:
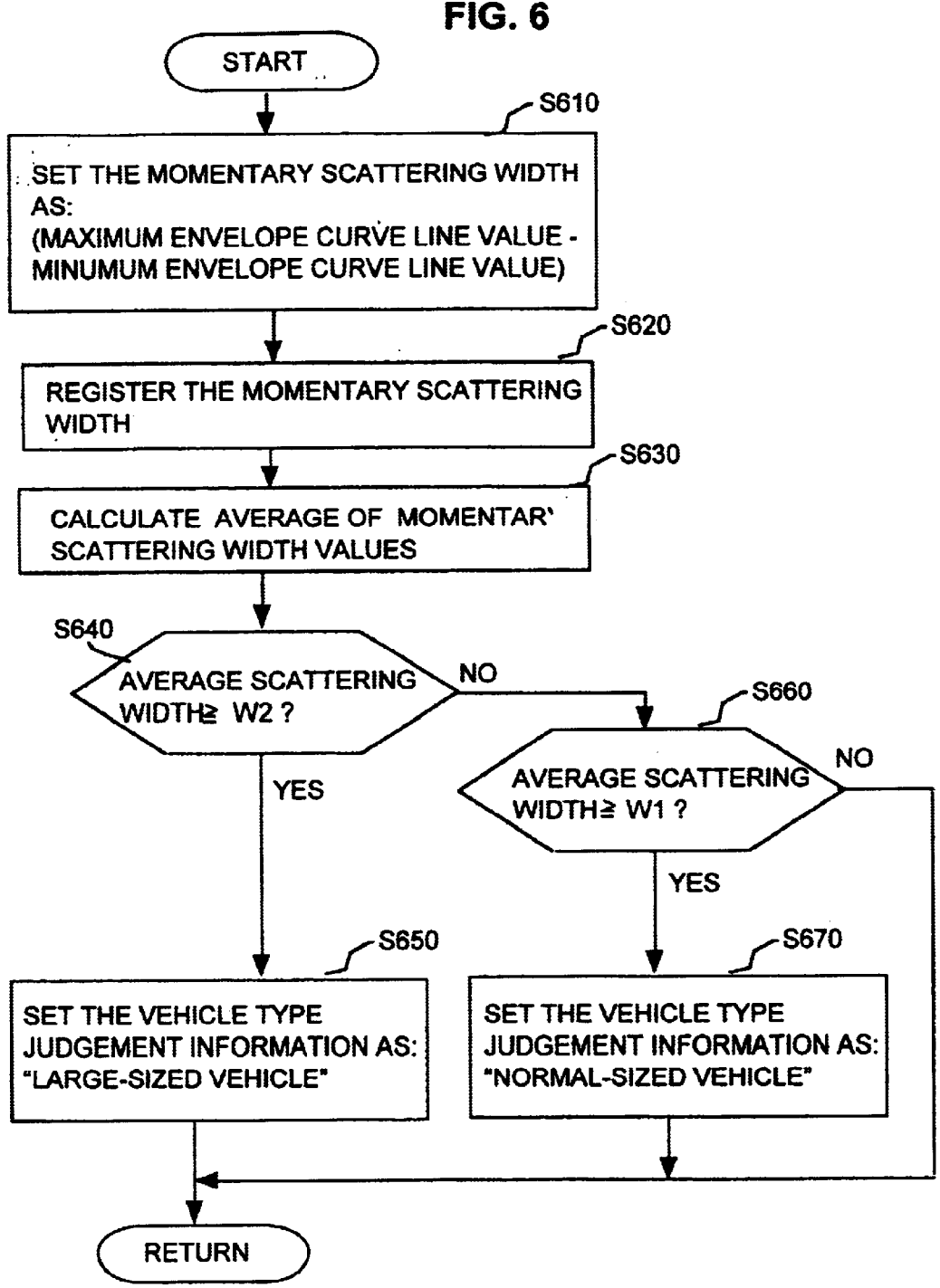
FIG. 6 is a flow diagram of width judgement processing which is executed as part of the main processing executed by the signal processing section.

The processing executed in the width judgement subroutine S400 will be described referring to the flow diagram of FIG. 6. Firstly, the difference between the pair of maximum and minimum envelope curve line values corresponding to the current time point, derived in the preceding execution of subroutine S390, is obtained as a value of momentary scattering width (e.g., at time Tn, the difference between the aforementioned maximum value 72 and minimum value 73) (step S610) and that value of momentary scattering width is then recorded (step S620).

The average value of the series of momentary scattering width values which have been registered up to the current time for this target object is then estimated. This can be done by applying smoothing processing by low-pass filtering, and obtaining the average of the maximum and minimum smoothed values. A decision is then made as to whether this average scattering width is greater than or equal to a 2nd predetermined vehicle width threshold value W2 (step S640). If so, then the Vehicle Type Judgement information is set as a predetermined value indicating "large-size vehicle" (step S650). Processing of this subroutine then ends. However if the average scattering width is less than the 2nd predetermined vehicle width threshold value W2, then a decision is made as to whether that average scattering width is greater than or equal to a 1st predetermined vehicle width threshold value W1 (W1<W2) (step S660). If the average scattering width is less than the 1st predetermined vehicle width threshold value W1, then processing of this subroutine is ended, while otherwise, the Vehicle Type Judgement information is set as a predetermined value indicating "normal-size vehicle" (step S670), and processing of this subroutine is ended.

It will be understood that a target object whose width is thus classified may not necessarily be a vehicle.

The 1st threshold value W1 is determined as a value which is slightly greater than the typical width of a private automobile, while the second threshold value W2 is made slightly greater than the typical width of a large-size vehicle such as a large truck, etc.

The processing executed in the corrected position data calculation subroutine S410, whereby corrected estimated lateral position values (referred to herein simply as corrected position values) are derived, will be described referring to the flow diagram of FIG. 7. Firstly, based on the value of radius of curvature of the vehicle lane, obtained in step S110, a decision is made as to whether the radius of curvature is less than a predetermined threshold value, to thereby determine whether the host vehicle is moving along a curved vehicle lane (step S710). If the radius of curvature is greater than the threshold value, this is taken as indicating that the host vehicle is not moving along a curved vehicle lane, and a decision is then made as to whether the target object is located in the same vehicle lane as the host vehicle (step S720). This judgement is made based on the recorded series of final lateral position values obtained up to the current point in time for that target object.

If the target object is found to be located in the vehicle lane of the host vehicle in step S720, then a weighting coefficient A which is applied to inner-side envelope curve line values (described hereinafter) is set as 0.5, while a weighting coefficient B which is applied to outer-side envelope curve line values is also set as 0.5 (step S730). In that way, no weighting is applied if the preceding vehicle is moving in the same lane as the host vehicle, along a substantially straight route. If however the target object is not found to be located in the vehicle lane of the host vehicle in step S720, then the weighting coefficients A and B are respectively set as 0.6 and 0.4.

In the following, radar waves which are reflected from a side face of a preceding vehicle will be referred to as "side reflection waves", with that face referred to as the "inner face" and the side of the preceding vehicle on which that face is located referred to as the "inner side", while the opposite side of the preceding vehicle will be referred to as the "outer side". If it is judged in step S710 that the host vehicle is travelling along a curved path, then in the same way as for step S720, a decision is made as to whether the preceding vehicle is moving along the same vehicle lane as the host vehicle (step S750). If a NO decision is reached, then the weighting coefficients A and B are respectively set as 0.6 and 0.4 (step S760). However if the preceding vehicle is judged to be moving along the same vehicle lane as the host vehicle, then the weighting coefficients A and B are respectively set as 0.7 and 0.3 (step S780).

Next, using the weighting coefficient values A and B which have been respectively established as described above, the weighted averages of respective pairs of concurrent inner side envelope curve line values and outer side envelope curve line values, to obtain a series of corrected position values. (step S780). Here, the "inner side envelope curve line values" are the one of the two series of (maximum, minimum) envelope curve line values which were derived in the subroutine S390 as described above, that corresponds to the inner side of the preceding vehicle, i.e., the side which is closest to the host vehicle. The "outer side envelope curve line values" are the other one of the two series of (maximum, minimum) envelope curve line values.

Figure 17B:
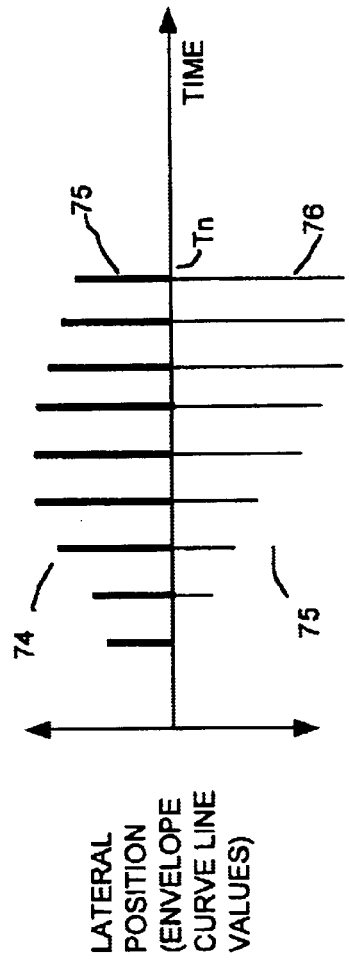
FIG. 17B is a corresponding diagram of a series of envelope curve line values derived from the values shown in FIG. 17A.
Figure 18C:
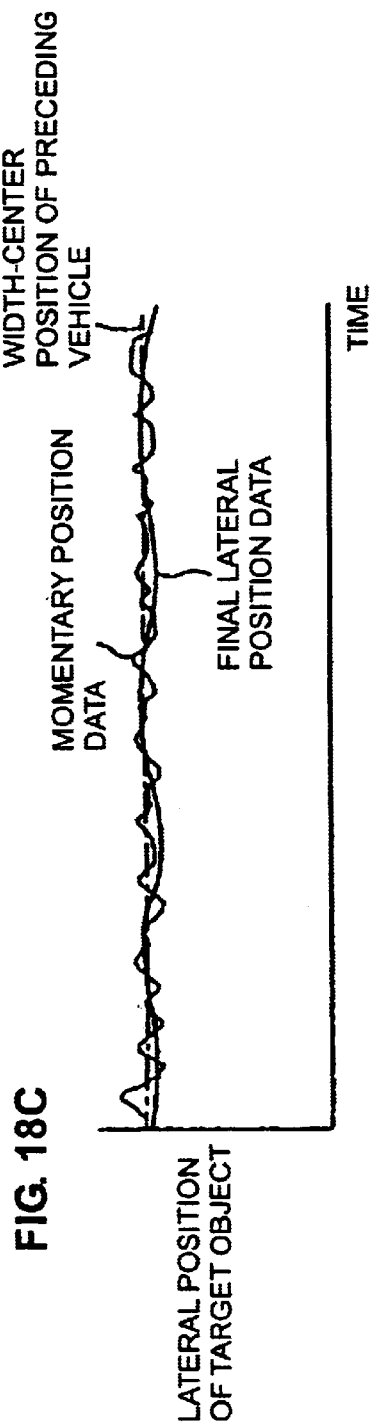
Figure 18D:
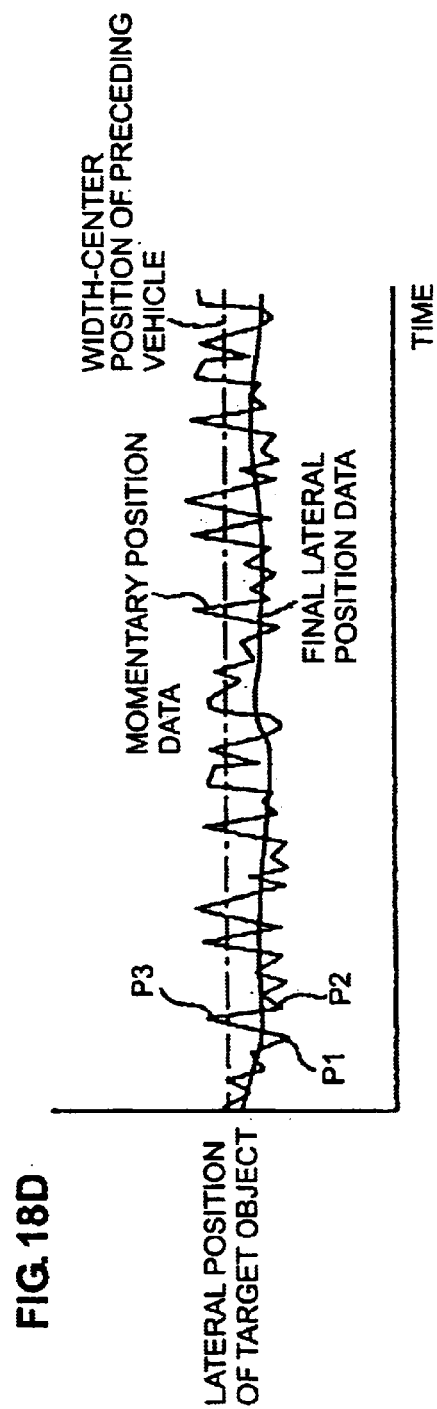

Specifically, each outer side envelope curve line value and the corresponding inner side envelope curve line value (i.e., concurrent values such as the pair of values designated as 75, 76 in FIG. 17B) are respectively multiplied by the weighting coefficients A and B, and the average of the result is registered as a corrected position value.

In that way, in a condition whereby the vehicles are moving along a curved vehicle lane, or the vehicle lane is straight but the preceding vehicle is moving adjacent to the vehicle lane of the host vehicle, so that some reflected waves will be received from a side face (i.e., the "inner side" face) of the preceding vehicle, then each envelope curve line value corresponding to the "outer side" is made relatively larger than that obtained for the "inner side", by applying the weighting coefficients A, B, before averaging is performed.

As indicated above, the two series (maximum, minimum) of envelope curve line values are selectively determined as being "outer-side envelope curve line data" and "inner-side envelope curve line data" respectively, by designating the side of the preceding vehicle which is closest to the host vehicle as the "inner" side.

The in-lane probability factor calculation subroutine S200, executed following the lateral position calculation subroutine S190, will be described referring to the flow diagram of FIG. 8. The processing shown in FIG. 8 is executed separately for each of the preceding vehicles which are being processed in this execution of the main routine of FIGS. 3A, 3B, i.e., for which information has been derived in step S180. Firstly, the in-lane probability factor for the preceding vehicle is calculated, using a probability map which has been generated beforehand (step S810). Since various procedures for generating such a map could be readily envisaged, detailed description is omitted. The in-lane probability factor for a preceding vehicle is obtained from the map by using, as parameters, the lateral position X obtained (as part of the final lateral position data) for this preceding vehicle in the execution of the preceding subroutine S190 and the distance Y which has been obtained for this preceding vehicle in step S180, in the processing of FIG. 7.

Next, based on the sequence of final lateral position values which have been derived for the target object up to the current time, a decision is made (step S820) as to whether the target object is in the process of moving laterally into the vehicle lane of the host vehicle, e.g., is "cutting across" from an adjacent highway lane into that of the host vehicle, or is running along a path which straddles the highway lane of the host vehicle and an adjacent lane. If a "no" decision is made, then this execution of the subroutine is ended. However if it is judged that the preceding vehicle is moving into the vehicle lane of the host vehicle, then a decision is made (step S830) as to whether the target object is in the aforementioned "large-sized vehicle" category, as indicated by the vehicle type information which was obtained in the width estimation processing of step S400 described above. If the target object is judged not to be in the "large-sized vehicle" category, then execution of the subroutine is ended. However if the vehicle category is judged to be "large-size", the in-lane probability factor which was obtained in step S810 is increased (S840) by a specific amount, which is obtained from a table that has been prepared beforehand, with the increase amount being determined by using, as table look-up parameters, the final lateral position and distance values which have been obtained for that target object. Execution of this subroutine then ends.

Figure 7:
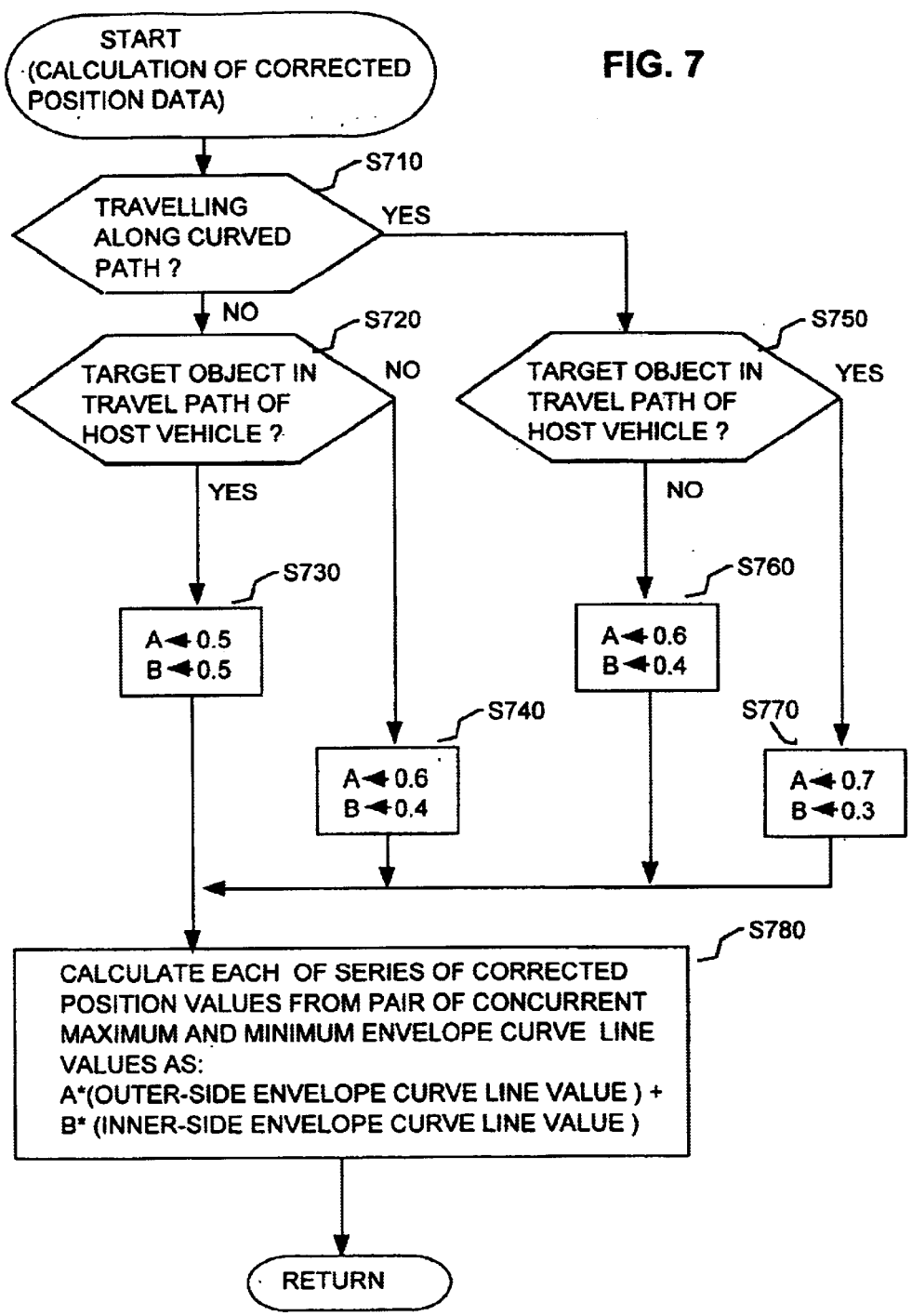
FIG. 7 is a flow diagram of corrected position data calculation processing which is executed as part of the main processing executed by the signal processing section.
Figure 8:
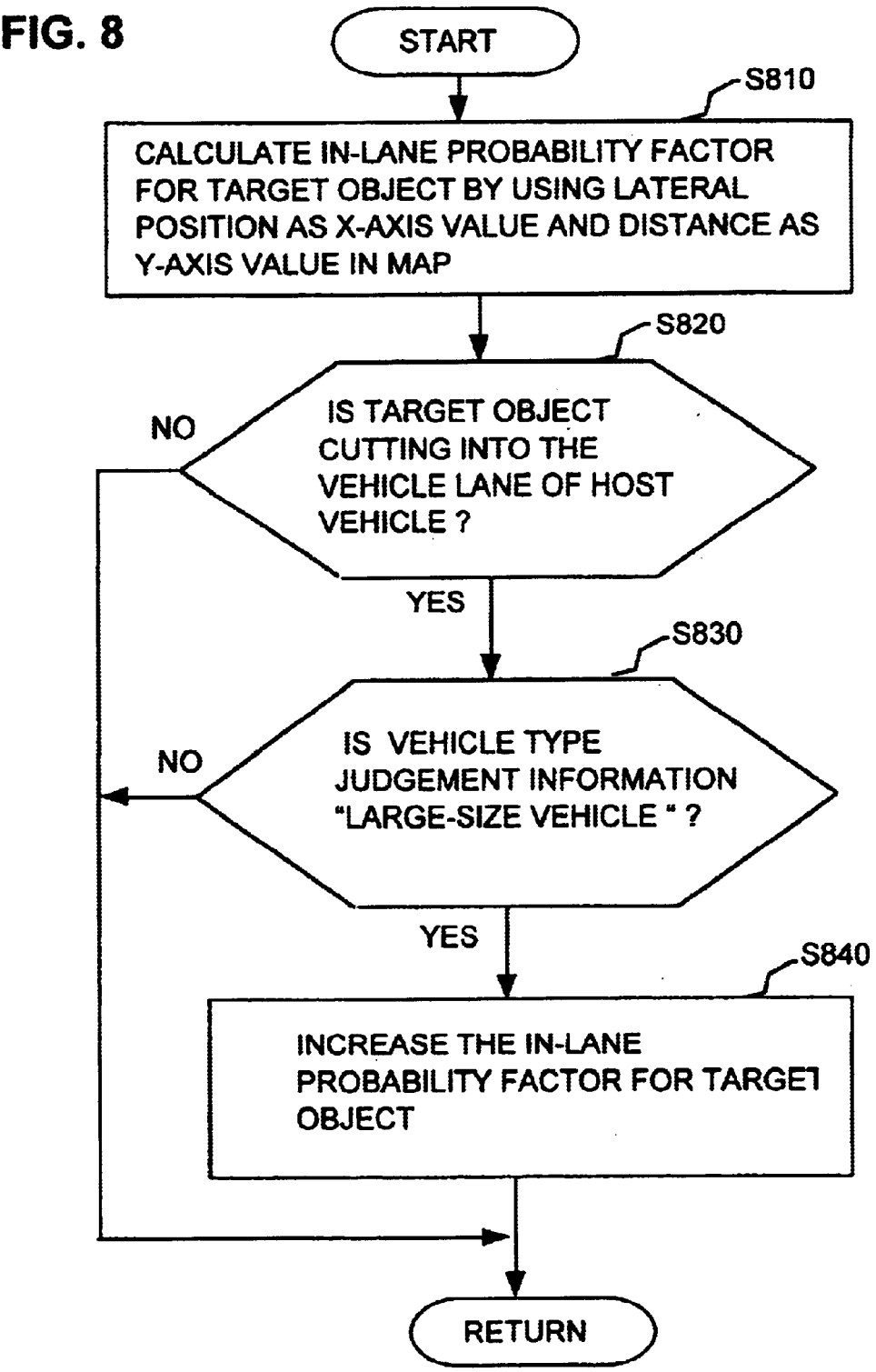
FIG. 8 is a flow diagram of in-lane probability factor calculation processing which is executed as part of the main processing executed by the signal processing section.

It should be understood that the invention is not limited to the use of envelope curve line values for deriving the corrected position data, and that for example other smoothing methods could be applied to the local extreme values of the momentary position data. The essential features of the invention, with respect to deriving corrected position data that will be used (if necessary) to obtain final lateral position data for a target object are as follows:

(a) the series of maximum (e.g., extreme rightward) and series of minimum (e.g., extreme leftward) lateral position values expressed by the momentary position data, up to the current point, are each subjected to smoothing, to obtain a corresponding series of maximum smoothed values and corresponding series of minimum smoothed values, and (b) weighted averaging (using weighting coefficients established as shown in FIG. 7) is applied to each concurrent pair of maximum and minimum smoothed values, to thereby obtain a corresponding series of weighted average values. These constitute the corrected position data, which may be selected in place of the momentary position data as described above to be smoothed, for thereby obtaining (updated) final lateral position data.

Figure 9:
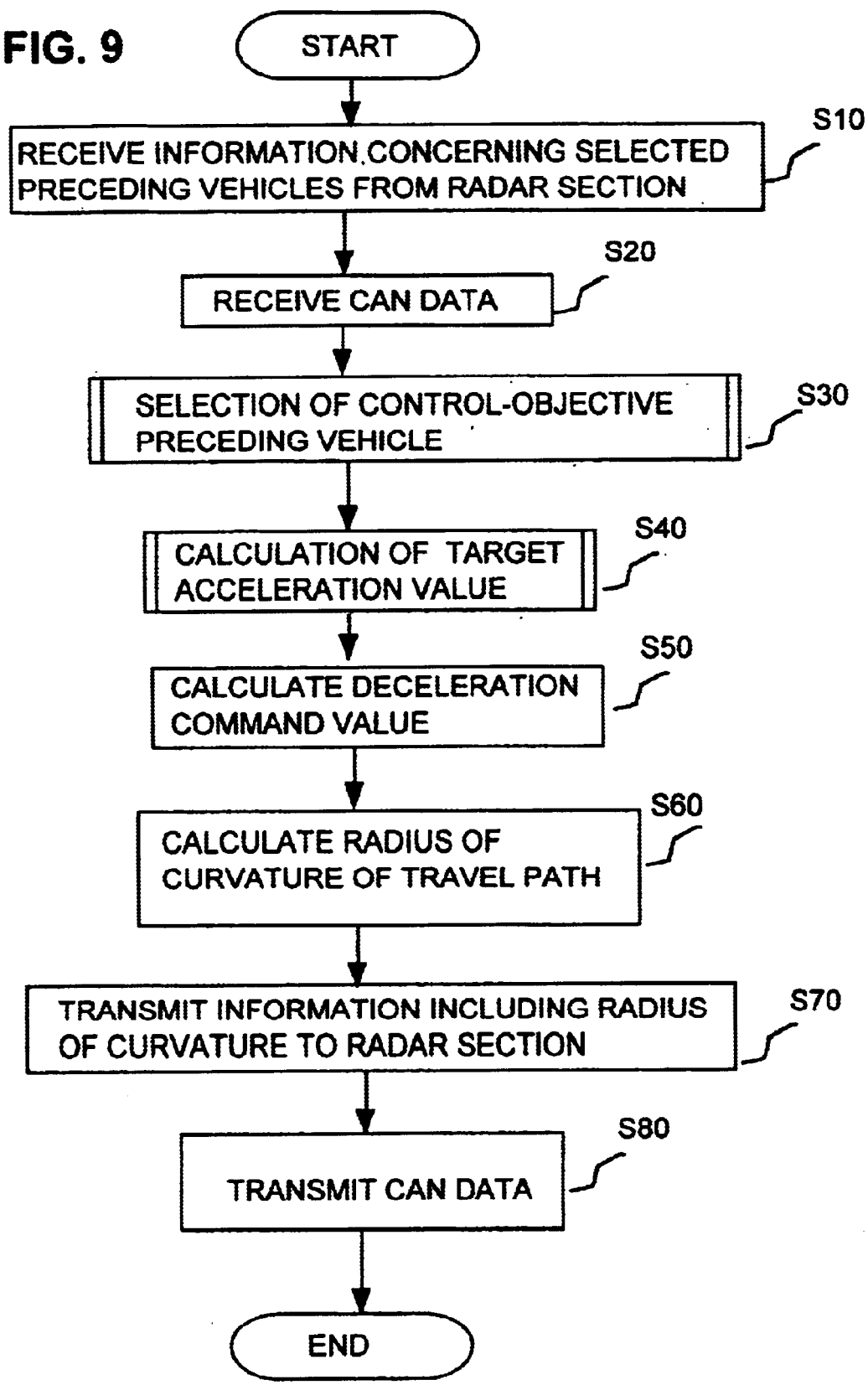
FIG. 9 is a flow diagram of main processing which is periodically executed by a vehicle separation control ECU of the cruise control apparatus, for processing data which are transmitted from the vehicle-mounted radar apparatus embodiment.

A main processing routine which is periodically executed by the vehicle separation control ECU 2, using information including that supplied from the radar apparatus 1 as described above, will be described referring to the flow diagram of FIG. 9.

Firstly in step S10, data including information concerning the aforementioned set of selected preceding vehicles are received from the radar apparatus 1. Next, in step S20, CAN data (i.e., data which are transferred using the aforementioned CAN protocol) relating to various aspects of the current operating condition of the vehicle are received from the brake ECU 3, the windshield wiper ECU 4 and the engine ECU 5. Specifically, data expressing the current vehicle speed, the engine control status, the steering angle, the yaw rate, brake control status, and windshield wiper status, etc., are received.

These received data are used by the vehicle separation control ECU 2 in executing subroutines for preceding vehicle selection (S30) and for calculation of target acceleration value (S40), a step of calculating a deceleration command value (S50), a step of deriving the radius of curvature of the vehicle lane (S60), a step of transmitting data expressing the host vehicle speed (Vn) and the radius of curvature, etc., to the radar apparatus 1 (S70), and a step of transmitting CAN data expressing the target acceleration value, braking request, fuel cut request, diagnostics information, display data, etc., to the brake ECU 3, the engine ECU 5 and the meter ECU 7 (S80).

Figure 10:
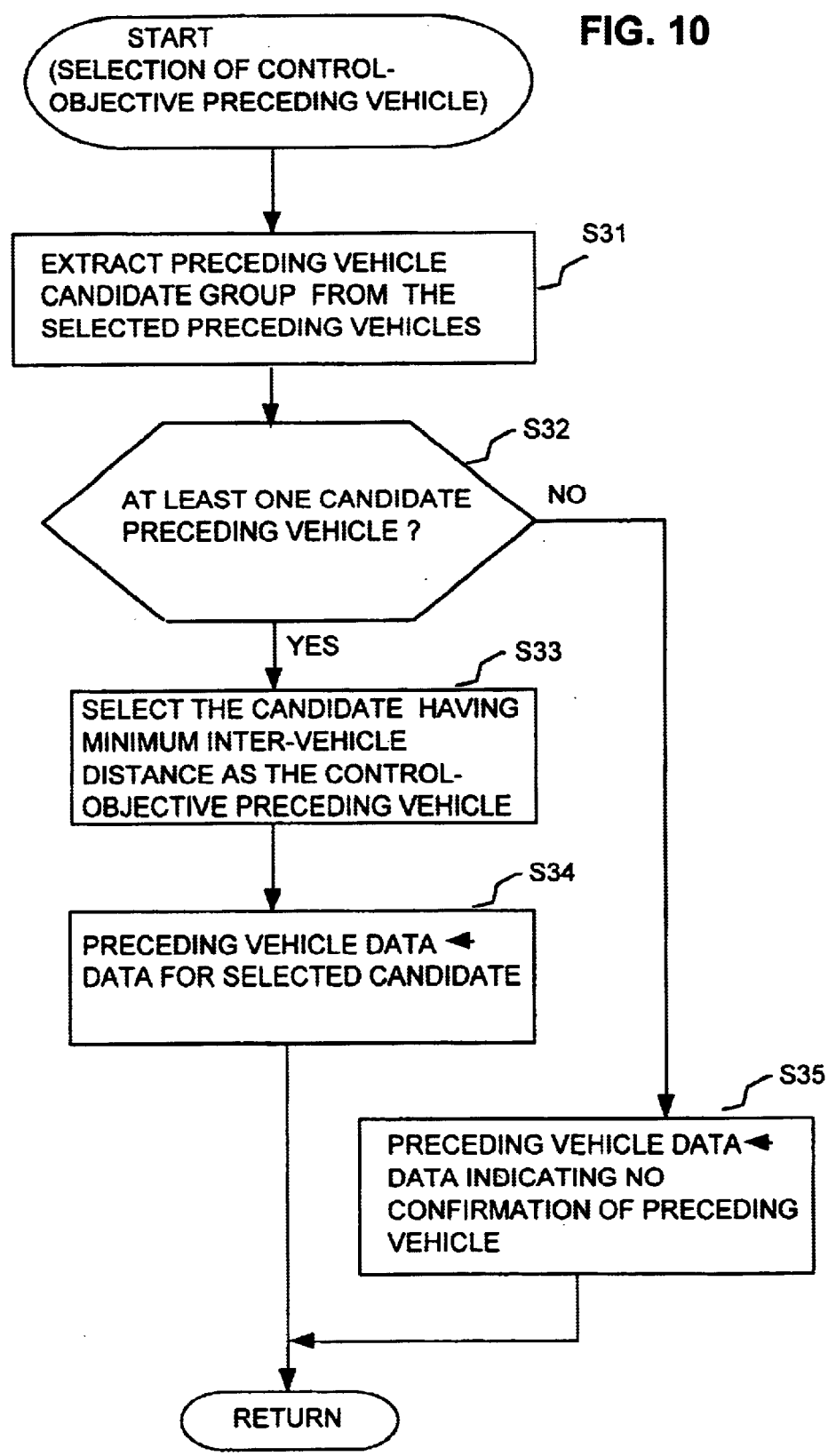
FIG. 10 is a flow diagram of vehicle selection processing which is executed as part of the main processing executed by the vehicle separation control ECU.

In the following, the processing contents of the subroutines S30 and S40 will be described. Firstly, the vehicle selection subroutine S30, whereby a specific preceding vehicle is selected from among the set of selected preceding vehicles, will be described referring to the flow diagram of FIG. 10.

In step S31, the information concerning the selected set of preceding vehicles which is received in step S10 is examined, to extract a set of "candidate preceding vehicles", that is to say, target objects each of which has some probability of being a specific object such as a preceding vehicle for which cruise control must be applied. In the following, such a specific one of the candidate preceding vehicles will be referred to as a "control-objective preceding vehicle". Specifically in step S31 the state of the Abnormal Scattering flag and the in-lane probability factor corresponding to each of the selected preceding vehicles are judged. If the in-lane probability factor is greater than a predetermined value P1 and also the Abnormal Scattering flag is cleared, for a selected preceding vehicle, then that preceding vehicle is categorized as a candidate preceding vehicle. Furthermore, if the Abnormal Scattering flag is set and the in-lane probability factor is greater than a predetermined value P2 (P2>P1), for a selected preceding vehicle, then that preceding vehicle is categorized as a candidate preceding vehicle.

On completion of that process of extracting a set of candidate preceding vehicles, a decision is made as to whether one or more candidate preceding vehicles have been extracted (step S32). If there is no candidate preceding vehicle, then data indicative of that fact are set as the preceding vehicle data obtained in this execution of the subroutine S30 (step S35) and execution is then ended. However if there is at least one candidate preceding vehicle, then the candidate preceding vehicle having the smallest value of distance from the host vehicle is selected as the control-objective preceding vehicle (step S33). Data relating to that preceding vehicle are then set as the preceding vehicle data obtained in this execution of the subroutine S30 (step S34) and execution is then ended.

If a target object has a large degree of scattering of its momentary position values (for example as illustrated in FIG. 15B) then the reliability of the final lateral position data obtained for that target object, and hence the reliability of the in-lane probability factor which has been derived for that target object, will be low. For that reason with the processing of step S31 of FIG. 10, if the Abnormal Scattering flag corresponding to a selected preceding vehicle is in the set condition, then that preceding vehicle will be selected as a candidate preceding vehicle only if the corresponding value of in-lane probability factor exceeds a substantially high threshold value (i.e., P2, made greater than P1). In that way, a stricter selection condition is applied to a target object having a relatively high degree of scatter in the corresponding momentary position data. The possibility of selecting an incorrect target object as being a control-objective preceding vehicle is thereby reduced as far as possible.

Next, the processing executed in the subroutine S40 of FIG. 9 will be described referring to the flow diagram of FIG. 11A. Firstly, a decision is made as to whether a control-objective preceding vehicle has been confirmed (step S41). If the decision is NO, then a value indicating that no control-objective preceding vehicle has been confirmed is set as the target acceleration value (step S46).

However if a control-objective preceding vehicle has been confirmed, then a value of deviation ratio of inter-vehicle distance is calculated for that vehicle (step S42), and then low-pass filtering is applied to the series of values of relative speed which have been determined for that vehicle, in successive executions of the main routine of the radar apparatus 1 as described above, up to the current point (step S43). The deviation ratio of inter-vehicle distance is a value obtained as a percentage, by subtracting a target value of separation distance (i.e., between the control-objective preceding vehicle and host vehicle) from the current actual separation distance, dividing the result by the target value of separation distance, and multiplying by 100. The target value of separation distance, determined by the vehicle separation control ECU 2, is varied in accordance with the speed of the host vehicle.

Figure 11A:
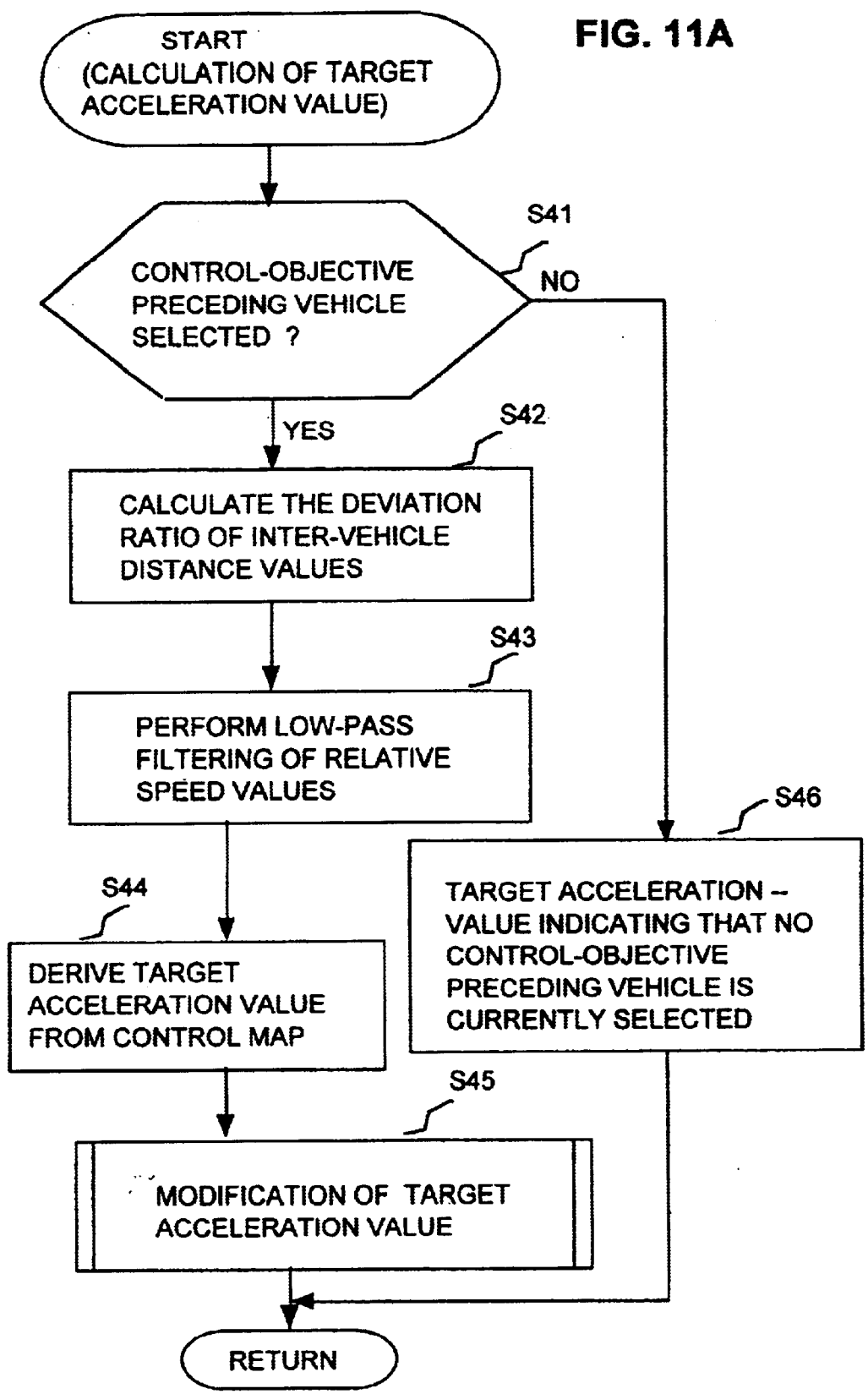
FIG. 11A is a flow diagram of target object acceleration calculation processing which is executed as part of the main processing executed by the vehicle separation control ECU.
Figure 11B:
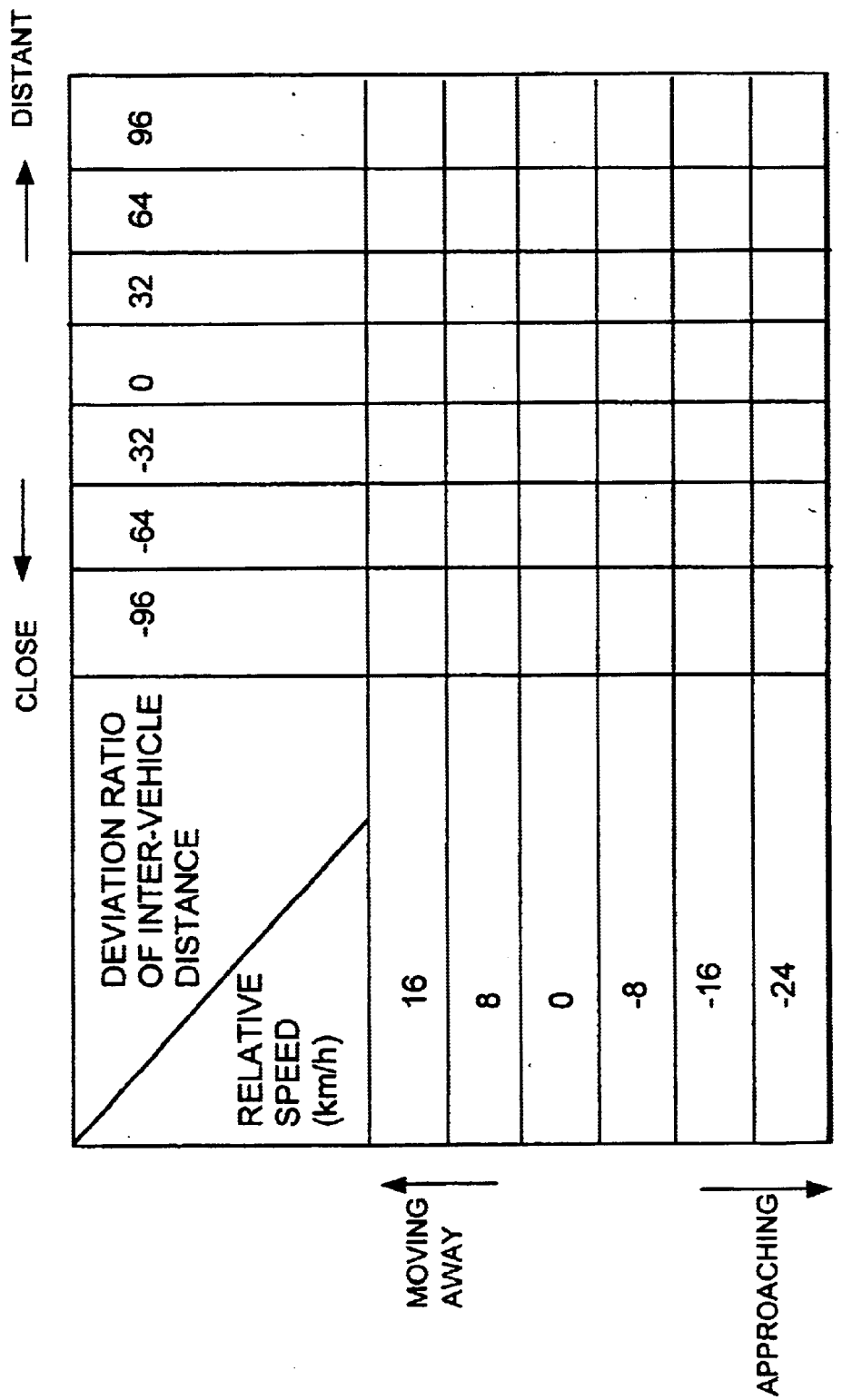
FIG. 11B illustrates a table which is used in the target object acceleration calculation processing.

In step S44, the deviation ratio of separation distance and smoothed value of relative speed which were obtained in steps S42, S43 are used as parameters to obtain a target acceleration value from the control map shown in FIG. 11B, which has been prepared beforehand. Correction is then applied to that target acceleration value, based on the state of the Abnormal Scatter flag corresponding to that preceding vehicle (the status of that flag, for each of the selected preceding vehicles, is contained in the information which is transmitted from the radar apparatus to the vehicle separation control ECU 2 concerning the set of selected preceding vehicles) (step S45). Execution of the subroutine S40 then ends.

In the control map, values of vehicle separation deviation ratio (%) are shown as −96, −64, −32, 0, 32, 64, 96, i.e. 7 values, while values for relative speed (Km/h) are shown as 16, 8, 0 −8, −16, −24, i.e., 6 values, from which a value of target acceleration can be obtained. Intermediate values, not shown in the map, can be utilized by linear interpolation of the map values. For input values which exceed the limits of the map, the terminal values of the map are utilized. It should be noted that it would also be possible to apply a guard range, having upper and lower limits, to values of vehicle separation deviation ratio which are within the range of the map.

Figure 12A:
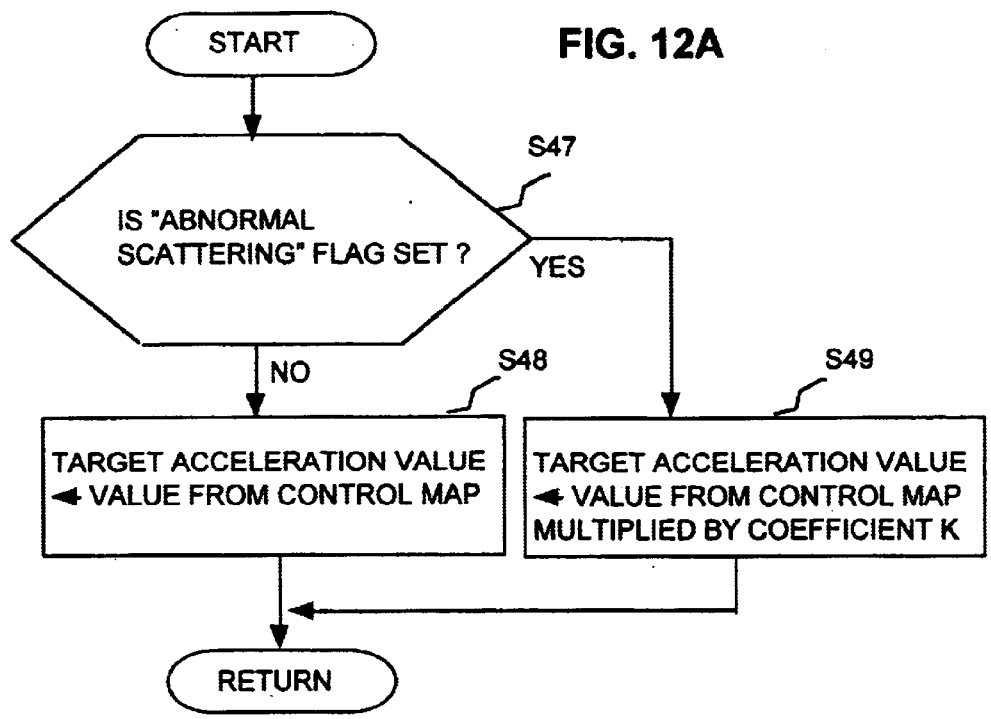
FIG. 12A is a flow diagram of target object acceleration compensation processing which is executed as part of the target object acceleration calculation processing.

The correction calculation processing which is executed in step S45 of FIG. 11A is shown in the flow diagram of FIG. 12A. Firstly, a decision is made as to whether the Abnormal Scattering flag corresponding to the control-objective preceding vehicle is set. If it is not set, then this indicates that the target acceleration value obtained in step S44 is not to be corrected, and so execution of this processing is ended. However if the Abnormal Scattering flag is set, then an acceleration compensation coefficient K is obtained from the graph shown in FIG. 12B, using the in-lane probability factor for the control-objective preceding vehicle as a parameter. The range of in-lane probability factors Pf2 to Pf3 shown in the graph is the range of factor values within which a target object may be selected as a control-objective preceding vehicle. The target acceleration value obtained in step S44 is then multiplied by that coefficient K, to obtain a corrected target acceleration value (step S49). Execution of this processing is then ended.

Figure 12B:
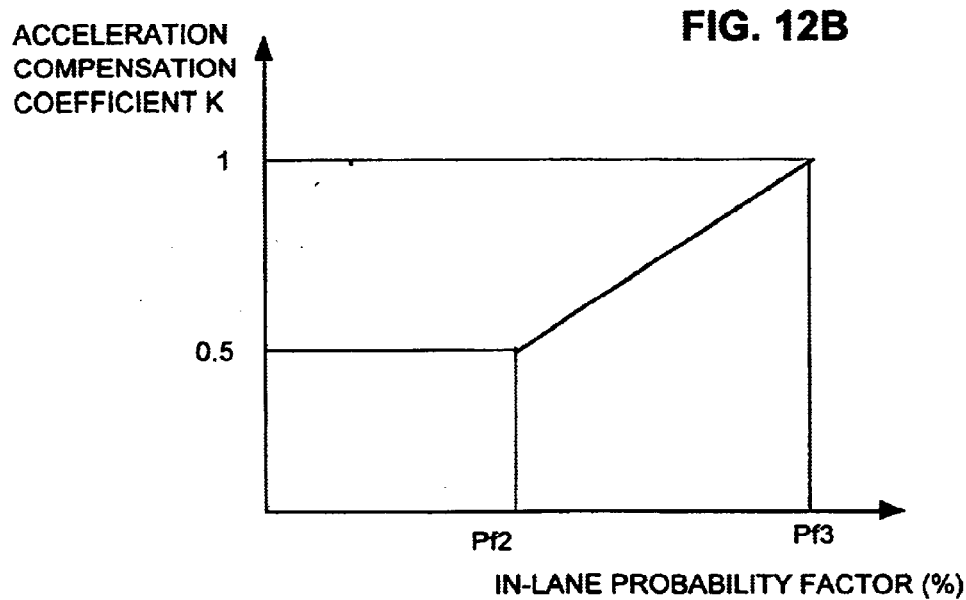
FIG. 12B is a graph of a function for deriving a compensation coefficient, used in the target object acceleration compensation processing.

It can be understood that as a result of the processing shown in FIG. 12A, even if the degree of scattering of the lateral positions (as expressed in the momentary position data derived by the radar apparatus 1) of a target object which has been selected as the control-objective preceding vehicle is excessively large (as indicated by the set condition of the Abnormal Scattering flag), cruise control will be applied for that target object in the normal manner, if the in-lane probability factor for that target object is sufficiently high, i.e., is close to the value Pf3 shown in FIG. 12B. That is to say, in such a case, it can be assumed that the control-objective preceding vehicle has been correctly detected by the system, so that the host vehicle can be accelerated based on the target acceleration value obtained from the control map. However if the degree of scattering of the lateral positions of the control-objective preceding vehicle is excessively high, and also the corresponding value of in-lane probability factor is relatively low (e.g., is close to the value Pf2 shown in 12B, lower than Pf3), so that there is a reduced degree of reliability of correctly detecting the control-objective preceding vehicle, then a reduced value of target acceleration is derived. This processing serves to enhance the safety and stability of operating the host vehicle under automatic cruise control.

As can be understood from the above description of this embodiment, if the momentary position data derived by the radar apparatus 1 for a target object exhibits a large degree of scattering of values, so that the dispersion value exceeds the aforementioned Level 1, smoothing processing is not directly applied to the momentary position data to obtain final lateral position data. Instead, corrected position data, are obtained by applying weighting correction to data derived from local extreme values of the momentary position data, using weighting coefficients which are determined based on the position relationship between the host vehicle and target object. In that case, the final lateral position data for that target object are obtained as the result of smoothing the corrected position data, instead of being obtained by smoothing the momentary position data.

Hence, even if there is instability in the values constituting the momentary position data derived by the radar apparatus 1, it becomes possible to obtain final lateral position data as a series of position values which are close to the series of actual lateral positions of the width-center location of the target object. As a result, through use of such final lateral position data, a high degree of reliability can be obtained for the in-lane probability factor that is derived for a target object. Thus, increased reliability can be obtained for a vehicle control system which utilizes respective in-lane probability factors that are derived for various target objects, e.g., for selecting a control-objective preceding vehicle as described above.

Figure 13B:
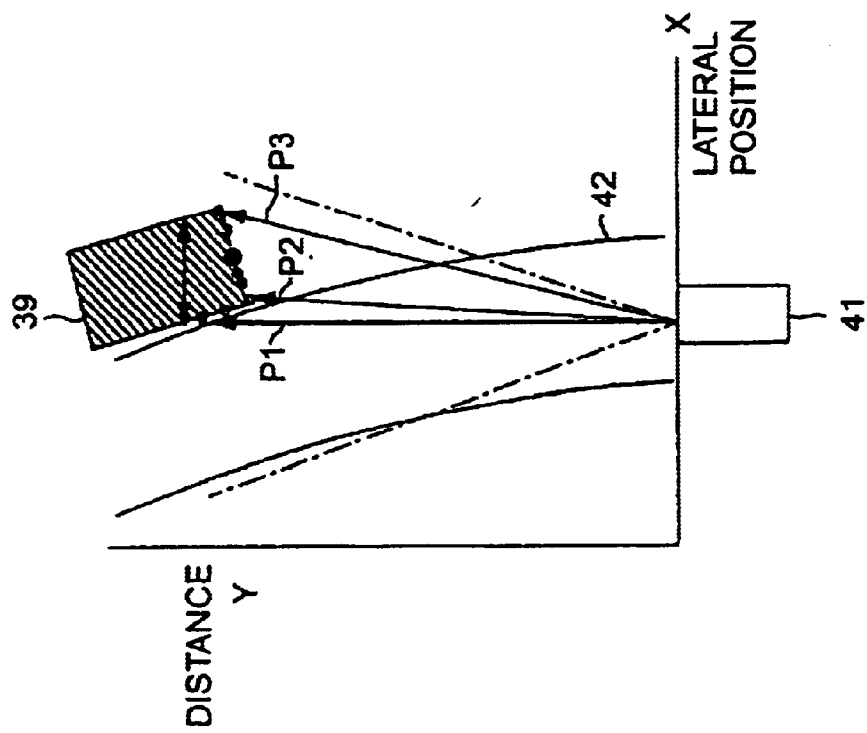
FIGS. 13A, 13B are respective diagrams for illustrating radar detection conditions of a preceding vehicle which is in the same vehicle lane as a host vehicle and a preceding vehicle which is in an adjacent vehicle lane to the host vehicle, respectively, when driving along a curved travel route.
Figure 13A:
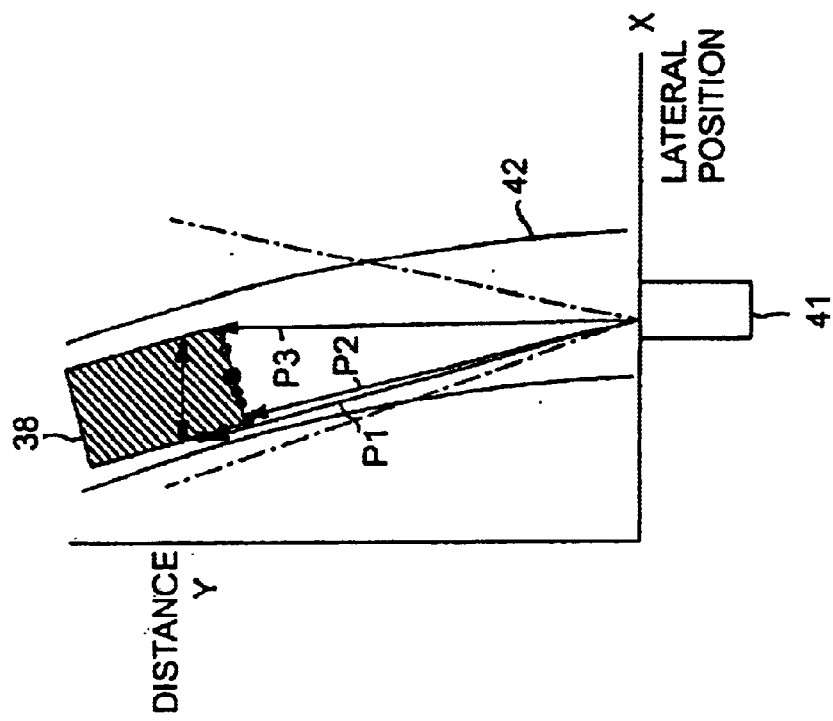

For example, when the target object is a preceding vehicle and the vehicle lane is curved, as in the example of FIG. 13A, then even if that preceding vehicle is driving in the center of the highway lane on which the host vehicle is travelling, the final lateral position data which are obtained by smoothing the momentary position data obtained for that target object will deviate substantially towards the (radially) inner side of the vehicle lane, as illustrated by the broken-line curve in the example of FIG. 14A. Thus, the series of in-lane probability factor values which would be derived based on such lateral position data would be as illustrated by the broken-line curve shown in FIG. 14C. Hence, the in-lane probability factors would be excessively small.

However as illustrated by the full-line curve shown in FIG. 14A, the final lateral position data which are derived from the aforementioned corrected position data closely represent the actual lateral position of the width-center location of the preceding vehicle. Hence, the in-lane probability factor values which are derived based on such final lateral position data will be of appropriate magnitude, as illustrated by the full-line curve in FIG. 14C. As a result, there is a substantially reduced possibility of failure to detect a preceding vehicle which is in the vehicle lane of the host vehicle.

Furthermore as illustrated in the example of FIG. 13B, when a preceding vehicle is located on a highway lane which is adjacent to that of the host vehicle, and the vehicle lane is curved, if final lateral position data were to be derived by simply smoothing the momentary position data then the obtained lateral positions would deviate substantially towards the inner side (as defined hereinabove) of the preceding vehicle. This is illustrated by the broken-line curve in FIG. 14A. The series of in-lane probability factor values which would be derived based on such final lateral position data might be as illustrated by the broken-line curve in FIG. 14D. Hence, the in-lane probability factor values would be excessively large.

However the final lateral position data which are obtained by smoothing the corrected position data will be close to the actual lateral positions of the width-center location of the preceding vehicle, as illustrated by the full-line curve in FIG. 14A. Hence, the in-lane probability factor values which are derived based on such final lateral position data will be of appropriate magnitude, as illustrated by the full-line curve in FIG. 14D. As a result, there is a substantially reduced possibility that a preceding vehicle which is running in an adjacent highway lane to that of the host vehicle will be incorrectly judged as being on the vehicle lane of the host vehicle, and be erroneously selected as a control-objective preceding vehicle.

Furthermore with this embodiment, the weighting coefficients A and B which are used in deriving the corrected position data as described above are modified in accordance with the radius of curvature of the vehicle lane and the relative position of the target object. As a result, even if the momentary position data are affected by reflected radar waves from a side face of a preceding vehicle, final lateral position data can be derived which are substantially accurate.

Moreover with this embodiment, each of the momentary position values which are derived based on the received radar signals is converted to a normalized momentary position value, i.e., an equivalent momentary lateral position estimate which would be derived for the case of travel along a road that extends in a straight line. As a result, it becomes unnecessary to perform compensation of the final lateral position data to correct for curvature of the vehicle lane. Hence, the processing for deriving information such as the in-lane probability factor for a target object, etc., can be substantially simplified.

Figure 15A:
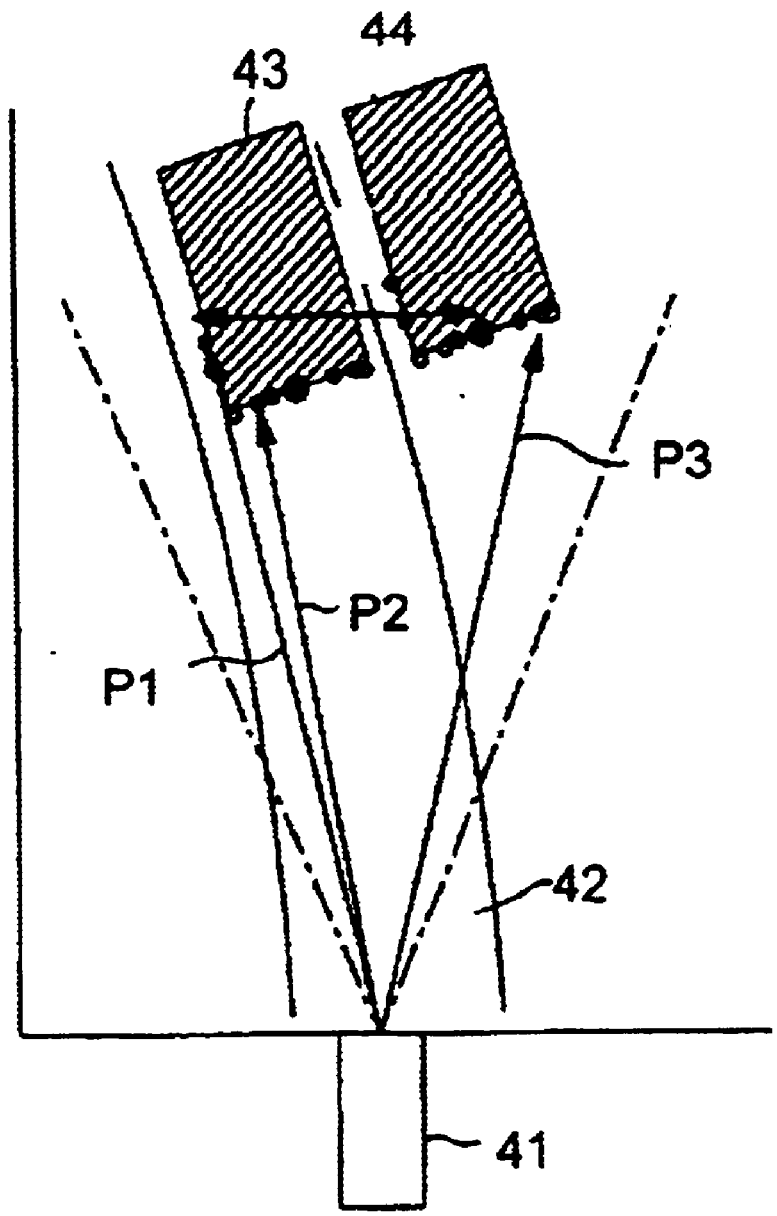
FIG. 15A is a diagram illustrating a condition in which two preceding vehicles are located side by side ahead of a host vehicle.

Furthermore with this embodiment, when there is a large degree of scattering of the momentary position data obtained for a target object, and that degree of scattering exceeds a predetermined value (Level 2), then derivation of final lateral position data from the corrected position data (i.e., from weighted averaged values of the maximum and minimum envelope curve line values) is halted, and a changeover is performed to deriving the momentary position data by smoothing the momentary position data. In addition, the Abnormal Scattering flag is set. That is to say, as illustrated in the example of FIG. 15A, if there are two preceding vehicles 43, 44 which are positioned side by side ahead of the host vehicle 41, with the preceding vehicle 43 in the vehicle lane 42 of the host vehicle 41, the reflected radio waves from these preceding vehicles 43, 44 would normally be detected by a millimeter-wave radar apparatus as being from a single target object. As shown in FIG. 15B, the resultant momentary position data, in such a case, would have a width of scattering that corresponds to twice the width of a single vehicle. As a result, the degree of scattering (measured as a dispersion value, as described above) will be extremely high. The Abnormal Scattering flag will thereby become set, as shown in FIG. 15C, and so a changeover will be performed from the condition of deriving the final lateral position data by smoothing the corrected position data to the condition of deriving the final lateral position data by directly smoothing the lateral position data.

It is thereby ensured that the final lateral position data will not erroneously express a position which is midway between the two preceding vehicles (thereby failing to show that there is a target object which is directly in the vehicle lane of the host vehicle). Instead, the final lateral position data will correctly indicate a lateral position which is approximately that of the preceding vehicle 43 which is closest to the host vehicle 41. It can thus be understood that greater accuracy of detection of preceding vehicles can be achieved, under such a condition, and hence greater safety of control of the host vehicle can be achieved.

As indicated above, the status of the Abnormal Scattering flag for each of the set of selected preceding vehicles is supplied from the radar apparatus 1 to the vehicle separation control ECU 2 of the cruise control system, for use in selecting the group of candidate preceding vehicles and hence selecting a control-objective preceding vehicle. In addition, as described referring to FIG. 12B, the vehicle separation control ECU is preferably configured such that, when a target value of acceleration has been derived, for controlling the host vehicle in relation to a control-objective preceding vehicle, and the degree of scattering of the momentary position data is excessive (as indicated by the state of the corresponding Abnormal Scattering flag), then the target acceleration value is reduced, with the degree of reduction being determined based on the value in-lane probability factor for that preceding vehicle.

This ensures increased safety and stability of control of the host vehicle by the cruise control system, for the following reasons. Referring to FIG. 1, the vehicle separation control ECU 2 derives the target value of acceleration based on the relative speed and distance information which are supplied from the radar apparatus 1 concerning the target object which has been selected as the control-objective preceding vehicle. The amount and direction of the target value of acceleration determines the degree of (positive) acceleration or braking that will be applied by the engine ECU 5 and braking ECU 3. If for example a non-existent object or an incorrect (e.g., substantially distant) target object is selected as the control-objective preceding vehicle, the relative speed and distance information which are received concerning that target object may be such that the target value of acceleration expresses a high level of deceleration. In such a case, abrupt braking will be unnecessarily applied to the host vehicle by the braking ECU 3 and engine ECU 5. Alternatively, if the relative speed and distance information concerning a control-objective preceding vehicle which is an actual preceding vehicle are inaccurate, the target value of acceleration may become dangerously high.

However a combination of a low value of in-lane probability factor and large degree of scattering of the momentary position data, for a target object, often signifies a low level of reliability for the information obtained by the radar apparatus 1 concerning that target object. With the above feature of the present invention, in such a case, the target value of acceleration is automatically reduced, in accordance with lowering of the in-lane probability factor obtained for the control-objective preceding vehicle. Hence, the occurrence of unnecessary abrupt braking or dangerous acceleration can be substantially reduced, ensuring greater safety and stability of control of the host vehicle.

Furthermore with this embodiment, the radar apparatus 1 uses the momentary scattering width information derived for a target object as described above, to estimate the width of the target object, and thereby obtain vehicle type judgement information for that object. If as described above referring to the flow diagram of FIG. 8, it is judged (based on the history of changes in the final lateral position data for that target object up to the current time) that the target object is cutting in ahead of the host vehicle (i.e., is in the process of moving from an adjacent highway lane into that of the host vehicle), and if it is judged from the width information that the target object is a large-size vehicle, then (step S840 in FIG. 8) the in-lane probability factor which has been derived for that target object is increased.

Figure 16B:
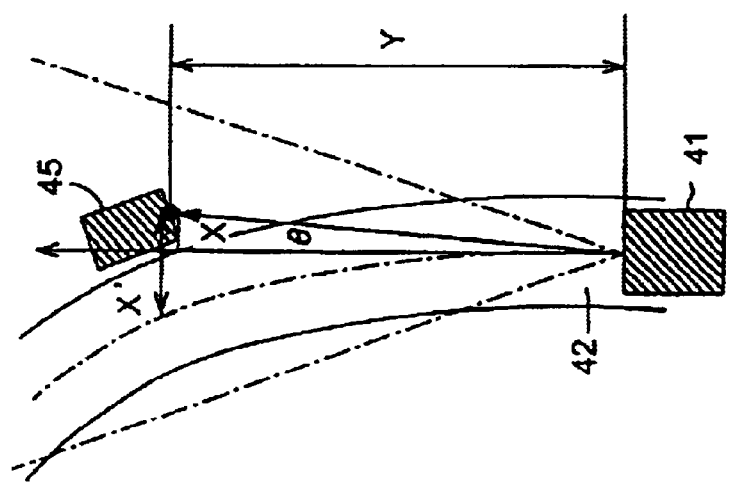
FIG. 16B is a diagram for use in describing the effects obtainable by assigning a target object to a vehicle size category, based on estimated width.
Figure 16A:
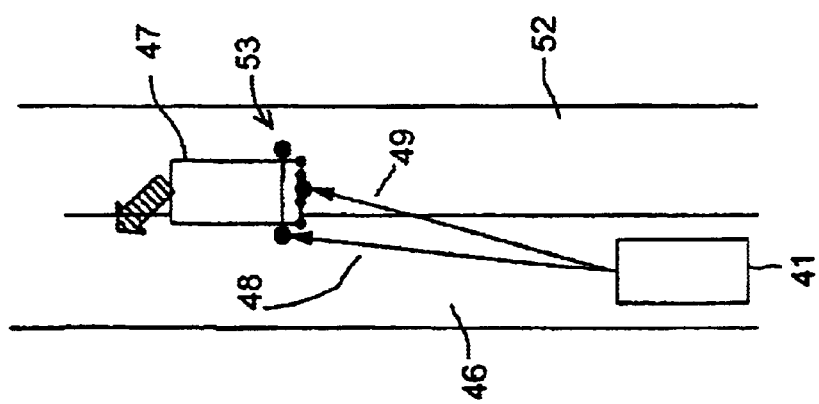
FIG. 16A is a diagram for use in describing normalization processing which is applied to each of successively obtained momentary position values for a target object.

Referring to the example of FIG. 16B, a preceding vehicle 47 is running in a highway lane 52, adjacent to the lane 46 of the host vehicle 41, and is cutting in ahead of the host vehicle 41. The width information derived from radio wave reflections from the preceding vehicle 47 is conceptually indicated by the two black dots 53. If the preceding vehicle 47 is judged (based on the width information) to be a normal-size vehicle, then the lateral position indicated for that vehicle by the corresponding final lateral position data will be as indicated by the arrow line 49, and the in-lane probability factor for that vehicle 47 will be determined accordingly (in step S810 of FIG. 8).

However if the preceding vehicle 47 is judged to be a large-size vehicle, then as a result of the adjustment feature described above, the in-lane probability factor which is established for that preceding vehicle 47 will be increased (in step S840 of FIG. 8). For example, the in-lane probability factor might become the value which would be obtained (in step S810 of FIG. 8) if the lateral position indicated for that vehicle by the final lateral position data were as indicated by the arrow line 48.

A large-size vehicle which is cutting in ahead of the host vehicle will more rapidly protrude into the vehicle lane of the host vehicle than would a small-size vehicle. However due to the above feature of this embodiment, the in-lane probability factor of the preceding vehicle is automatically increased for a large-size vehicle, thereby enabling the vehicle separation control ECU 2 to rapidly select that vehicle as a control-objective preceding vehicle, and so quickly respond to such a traffic condition. Greater safety of control of the host vehicle, with reduced possibility of sudden deceleration being applied by the operation of the cruise control system, can thereby be achieved.

Figure 4A:
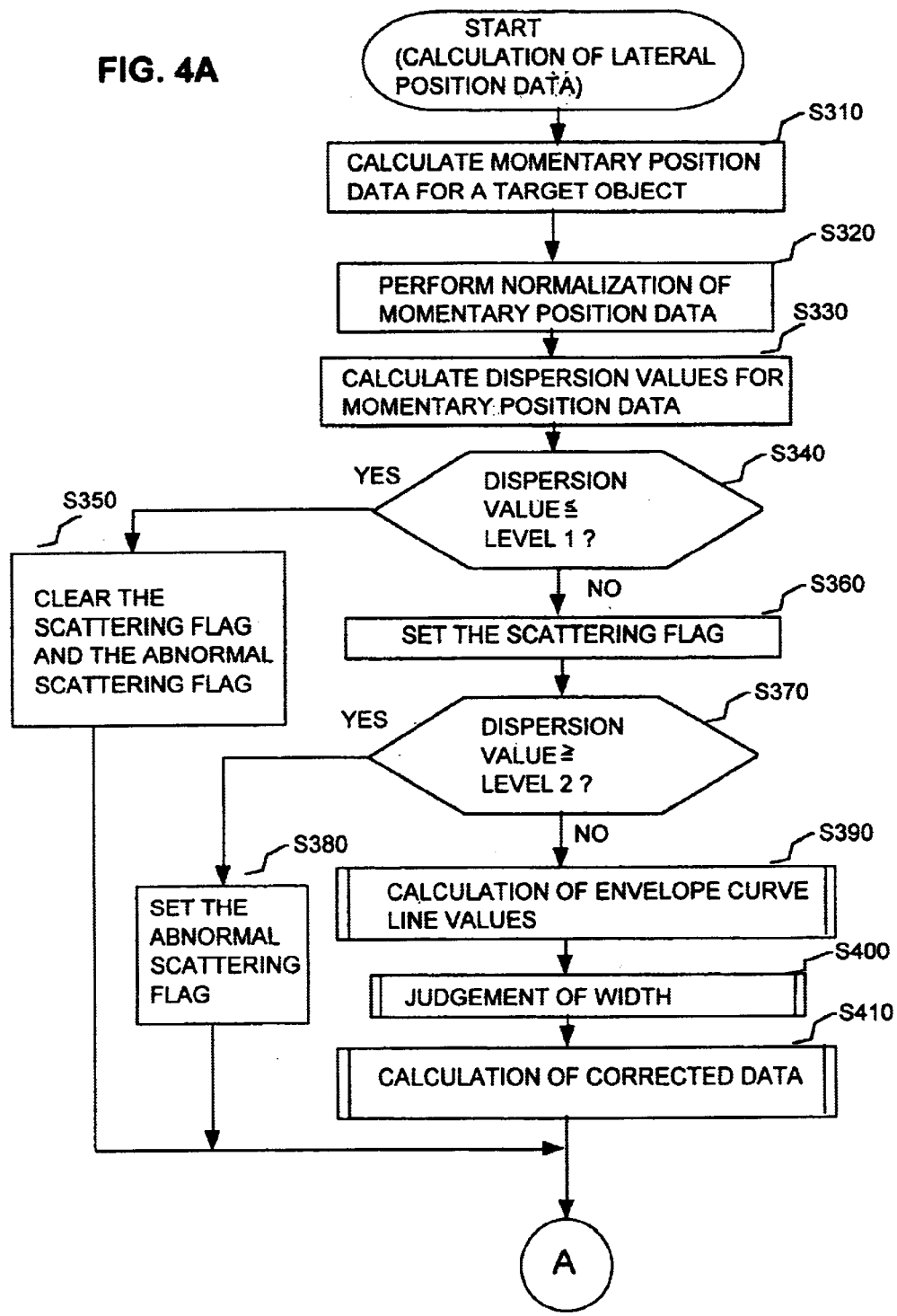
FIG. 4 is a flow diagram of lateral position calculation processing which is executed as part of the main processing executed by the signal processing section.
Figure 4B:
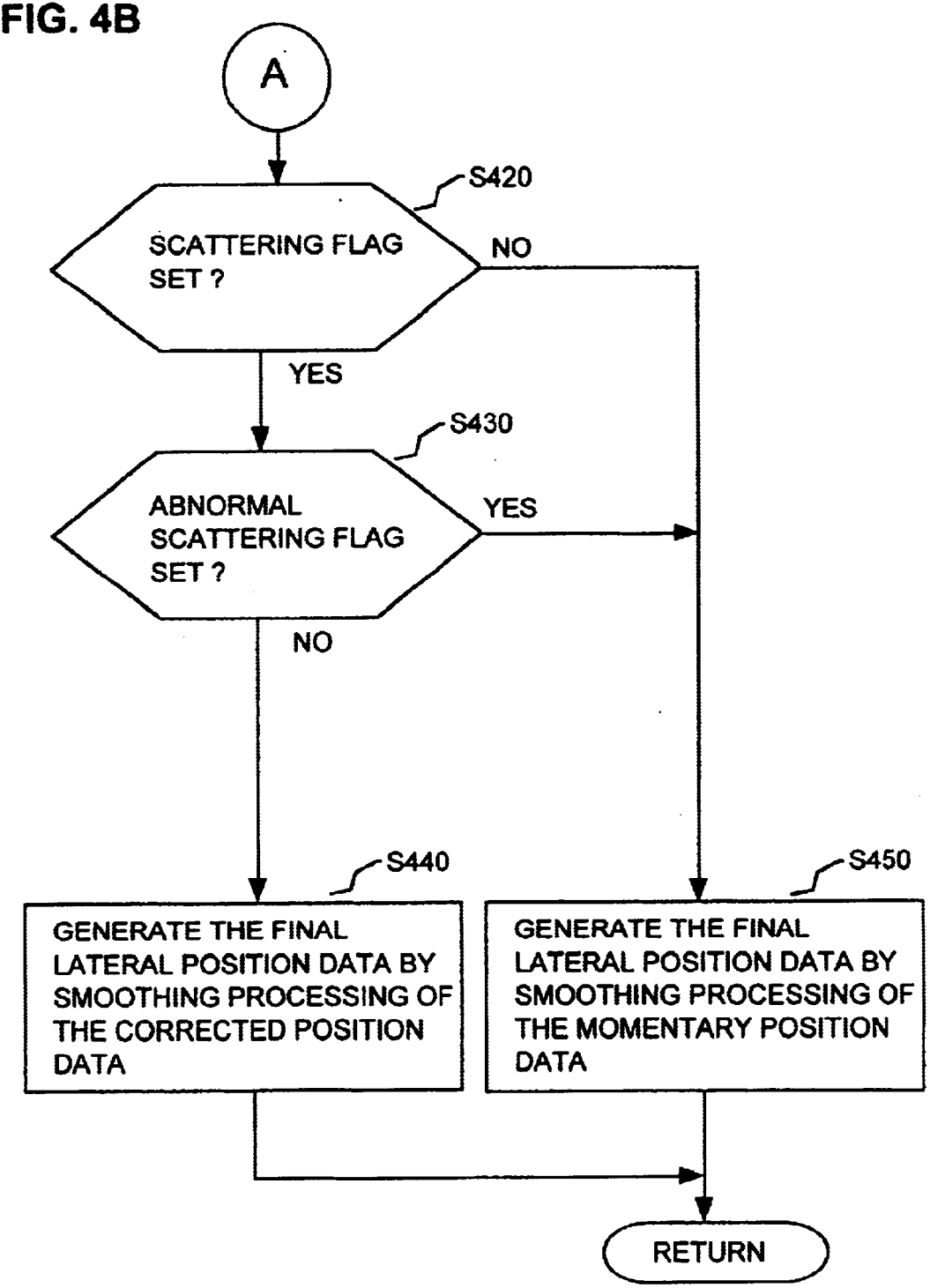

In the above description, the processing of step S310 of the main program routine of FIGS. 4A, 4B implements a momentary position data generating function. The processing of steps S420 and S440, in combination, implements a final lateral position data generating function whereby the momentary position data are utilized in deriving the final lateral position data. The processing of step S330 implements a source calculation function, applied to the momentary position data. The processing of the subroutine S410 implements a corrected position data generating function.

The processing of steps S340, S350, S420 and S450, in combination, implements a data selection function whereby the corrected position data may be selected in place of the momentary position data, to be used in deriving the final lateral position data. The processing of steps S370, S380 and S430, in combination, implements an inhibit function, whereby the selection of the corrected position data to be used in deriving the final lateral position data may be inhibited. The processing of steps S710, S720 and S750 shown in FIG. 7, in combination, implements a reflection condition judgement function. The processing of steps S740, S760 and S770, in combination, implements a weighting coefficient modification function. The processing of steps S610, S620 and S630 shown in FIG. 6, in combination, implements a width calculation function. The processing of steps S640, S650, S660 and S670, in combination, implements a vehicle type judgement function. The processing of step S810 shown in FIG. 8 implements an in-lane probability factor calculation function. The processing of steps S820, S830 and S840, in combination, implements an adjustment function, for selectively adjusting a value of in-lane probability factor.

Although the invention has been described in the above referring to a specific embodiment of a vehicle-mounted radar apparatus, the invention is not limited to that embodiment, and various changes could be envisaged which fall within the scope claimed for the invention in the appended claims.

For example, with the above embodiment, when a judgement is made as to whether side reflection radio waves from a preceding vehicle are having an effect upon the momentary position data which are obtained for that vehicle, that judgement is made based upon externally supplied information, such as the radius of curvature of the vehicle lane. However it would be equally possible to derive two series of final lateral position data in parallel, i.e., final lateral position data which are derived by smoothing the momentary position data, and final lateral position data which are derived by smoothing the corrected position data (obtained from the envelope curve line values as described above), and to compare these two series of final lateral position data. If the difference between these exceeds a predetermined limit value, then this would indicate that the momentary position data are being affected by side reflection waves from the preceding vehicle.

Furthermore with the above embodiment, the degree of scattering of the momentary position data is judged based on the dispersion value that is calculated for the momentary position data. However it would be equally possible to judge the degree of scattering based upon a difference between extreme (maximum, minimum) values of the momentary position data, or a difference between maximum and minimum envelope curve line values.

What is claimed is:

1. A vehicle-mounted radar apparatus equipped on a host vehicle, said apparatus having radar means for transmitting radar waves and for deriving received signals from resultant radar waves reflected by a target object, momentary position data generating means for processing said received signals to derive momentary position data as a series of successively estimated lateral position values for said target object, and final lateral position data generating means for performing smoothing processing said momentary position data to obtain final lateral position data expressing a series of successively estimated lateral positions of a width-center location on said target object;

wherein said vehicle-mounted radar apparatus comprises scattering calculation means for calculating a degree of scattering of said momentary position data;

corrected position data generating means for extracting a series of local maximum values and a series of local minimum values of said momentary position data, said local maximum and local minimum values expressing extreme values of lateral displacement in a mutually opposite first direction and second direction respectively, said first and second directions being oriented at right angles to a travel direction of said host vehicle, and for deriving corrected position data based on weighted average values of said maximum values and minimum values, means for judging whether said degree of scattering exceeds a predetermined first threshold value, and data selection means for supplying said corrected position data to said final lateral position data generating means in place of said momentary position data, when it is judged that said degree of scattering exceeds said first threshold value.

2. The vehicle-mounted radar apparatus according to claim 1, comprising means for deriving maximum envelope curve line values by smoothing processing of said maximum values of said momentary position data and deriving minimum envelope curve line values by smoothing processing of said minimum values of said momentary position data, wherein said corrected position data generating means derives said corrected position data as a series of corrected position values respectively obtained by performing weighted averaging of concurrent pairs of said maximum envelope curve line values and minimum envelope curve line values.

3. The vehicle-mounted radar apparatus according to claim 1, wherein said scattering calculation means derives said degree of scattering as a dispersion value of a predetermined number of said momentary position values which have been most recently successively derived by said momentary position data generating means.

4. The vehicle-mounted radar apparatus according to claim 1, comprising means for judging whether said degree of scattering exceeds a predetermined second threshold value which is greater than said first threshold value, and inhibit means for inhibiting operation of said data selection means when it is judged that said degree of scattering exceeds said second threshold value.

5. The vehicle-mounted radar apparatus according to claim 4, wherein said inhibit means comprises notification means operating while said inhibit means is inhibiting operation of said data selection means, for transmitting notification information to equipment of said host vehicle other than said vehicle-mounted radar apparatus, said notification information indicating that said final lateral position data has a low degree of reliability.

6. The vehicle-mounted radar apparatus according to claim 1, comprising means for selecting a target object as being a preceding vehicle, and reflection condition judgement means, operating when said target object is selected as being a preceding vehicle, for judging whether said momentary position data is affected by side reflection radar waves which are reflected from a side face of an inner side of said preceding vehicle;

wherein said corrected position data generating means comprises
means for applying weighting coefficients to selectively apply weighting to said series of maximum values and to said series of minimum values of said momentary position data, and
weighting coefficient modification means operating when it is judged that said momentary position data are affected by said side reflection radar waves, for modifying said weighting coefficients such as to apply greater weighting to a selected one of said series of maximum values and said series of minimum values, said selected series corresponding to locations on said preceding vehicle which are adjacent to an outer side that is opposite said inner side.

7. The vehicle-mounted radar apparatus according to claim 6, adapted to receive information expressing a radius of curvature of said vehicle lane of said host vehicle, wherein said reflection condition judgement means comprises means for judging whether said radius of curvature is less than a predetermined threshold value, and for determining that said momentary position data are affected by said side reflection radar waves when said radius of curvature is found to be less than said threshold value.

8. The vehicle-mounted radar apparatus according to claim 6, comprising means for judging whether a preceding vehicle is moving along a vehicle lane which is adjacent to said vehicle lane of said host vehicle, wherein said reflection condition judgement means determines that said momentary position data are affected by said side reflection radar waves when it is judged that said preceding vehicle is located on a vehicle lane which is adjacent to said vehicle lane of said host vehicle.

9. The vehicle-mounted radar apparatus according to claim 1, wherein said momentary position data generating means comprises normalization means for performing normalization calculation processing to convert each of said successively obtained momentary position values to respectively corresponding normalized momentary position values, each said normalized momentary position value corresponding to a condition of said vehicle lane being along a straight line which is oriented along a current travel direction of said host vehicle.

10. The vehicle-mounted radar apparatus according to claim 9, adapted to receive information expressing a radius of curvature of said vehicle lane of said host vehicle, and comprising means for deriving successive estimated values of distance and direction of said preceding vehicle from said received signals, wherein said normalization means utilizes said radius of curvature information and said estimated values of distance and direction which correspond to a momentary position value, to calculate a corresponding normalized momentary position value.

11. The vehicle-mounted radar apparatus according to claim 1, comprising width calculation means for deriving from said momentary position data an estimated value of width of said target object.

12. The vehicle-mounted radar apparatus according to claim 11, wherein said width calculation means derives said estimated value of width based upon a width of said scattering of said momentary position data.

13. The vehicle-mounted radar apparatus according to claim 11, comprising means for deriving maximum envelope curve line values by smoothing processing of said maximum values of said momentary position data and deriving minimum envelope curve line values by smoothing processing of said minimum values of said momentary position data,
wherein said width calculation means derives said estimated value of width based upon a difference between said maximum envelope curve line values and minimum envelope curve line values.

14. The vehicle-mounted radar apparatus according to claim 11, comprising vehicle type judgement means for specifying a vehicle type corresponding to said target object, based on said estimated value of width.

15. The vehicle-mounted radar apparatus according to claim 1, comprising
in-lane probability factor calculation means for deriving an in-lane probability factor as a value expressing a degree of probability that said target object is located on said vehicle lane of said host vehicle, and
adjustment means for applying adjustment to increase said in-lane probability factor in accordance with increasing width of said scattering of said momentary position data.

16. The vehicle-mounted radar apparatus according to claim 1, wherein each of said means other than said radar means are implemented by a computer program which is executed by a computer.

17. The vehicle-mounted radar apparatus according to claim 1, incorporated in a vehicle control apparatus having control means for deriving a target value of acceleration based on position data supplied from said radar apparatus and for controlling said host vehicle with respect to a specific target object in accordance with said target value of acceleration, said radar apparatus comprising
means for judging whether said degree of scattering exceeds a second predetermined threshold value which is greater than said first threshold value and
means for transmitting, to said control means of said vehicle control apparatus, information that indicates whether position data relating to said specific target object are derived from momentary position data for which said second degree of scattering is exceeded.

* * * * *

UNITED STATES PATENT AND TRADEMARK OFFICE
CERTIFICATE OF CORRECTION

PATENT NO. : 6,768,446 B2
DATED : July 27, 2004
INVENTOR(S) : Yukimasa Tamatsu, Hiroaki Kumon and Akira Isogai It is certified that error appears in the above-identified patent and that said Letters Patent is hereby corrected as shown below:

Title page,
Item [54], Title, should read as -- VEHICLE-MOUNTED RADAR APPARATUS PROVIDING IMPROVED ACCURACY OF DETECTION OF LATERAL POSITION OF PRECEDING VEHICLE BY REDUCING ERRORS CAUSED BY SCATTERING OF POSITION VALUES AND CAUSED BY POSITION RELATIONSHIP TO PRECEDING VEHICLE --

Signed and Sealed this

Twenty-first Day of December, 2004

JON W. DUDAS
*Director of the United States Patent and Trademark Office*